US011334599B2

(12) United States Patent
Sawatzky et al.

(10) Patent No.: US 11,334,599 B2
(45) Date of Patent: May 17, 2022

(54) SYSTEMS AND METHODS FOR ELECTRONIC DATA RECORD SYNCHRONIZATION

(71) Applicant: Computer Projects of Illinois, Inc., Bolingbrook, IL (US)

(72) Inventors: Kevin Sawatzky, Naperville, IL (US); Ryan Sawatzky, Naperville, IL (US); Steven Sawatzky, Lemont, IL (US); Qian Karen Yuan, Darien, IL (US); Scott Hoffman, Bloomingdale, IL (US); Rungkiart Thongsri, Orland Hills, IL (US); Cathy Wantroba, Plainfield, IL (US); Mark McQueen, Plainfield, IL (US); Thomas Szum, Shorewood, IL (US); Bing Tong, Naperville, IL (US); Michael Khan, Lisle, IL (US); Maria A. Martinez, Bolingbrook, IL (US); Louis Filipow, Naperville, IL (US)

(73) Assignee: COMPUTER PROJECTS OF ILLINOIS, INC., Bolingbrook, IL (US)

( * ) Notice: Subject to any disclaimer, the term of this patent is extended or adjusted under 35 U.S.C. 154(b) by 360 days.

(21) Appl. No.: 16/255,542

(22) Filed: Jan. 23, 2019

(65) Prior Publication Data
US 2019/0228020 A1 Jul. 25, 2019

Related U.S. Application Data

(60) Provisional application No. 62/620,855, filed on Jan. 23, 2018.

(51) Int. Cl.
*G06F 16/27* (2019.01)
*G06F 16/21* (2019.01)
*G06F 16/25* (2019.01)

(52) U.S. Cl.
CPC ............ *G06F 16/275* (2019.01); *G06F 16/21* (2019.01); *G06F 16/258* (2019.01); *G06F 16/273* (2019.01)

(58) Field of Classification Search
CPC .... G06F 16/275; G06F 16/2308; G06F 16/21; G06F 16/273
See application file for complete search history.

(56) References Cited

U.S. PATENT DOCUMENTS 5,999,947 A * 12/1999 Zollinger ............... G06F 16/273
6,295,541 B1 * 9/2001 Bodnar ................. G06F 16/275
(Continued)

OTHER PUBLICATIONS

NCIC 2000 Operating Manual, issued in 1999 with Technical and Operational Updates (TOU) incorporated through TOU 12-3, issued Oct. 22, 2012, 1153 pages.

*Primary Examiner* — James Trujillo
*Assistant Examiner* — J Mitchell Curran
(74) *Attorney, Agent, or Firm* — Hanley, Flight & Zimmerman, LLC

(57) ABSTRACT

Systems and method for database record synchronization are disclosed herein. An example apparatus includes a request receiver to receive a request including a first record. The first record is stored in a first database. The example apparatus includes a database searcher to search a second database for a second record based on the request. The example apparatus includes a record parser to generate a first parsed record based on the first record and a second parsed record based on the second record, perform a comparison of the first parsed record and the second parsed record, and identify a difference between first data in the first parsed record and second data in the second parsed record. The example apparatus includes a communicator to transmit a transaction message to the second database to modify the second data based on the first data.

21 Claims, 6 Drawing Sheets

(56) References Cited

U.S. PATENT DOCUMENTS

| | | | |
|---|---|---|---|
| 2005/0179694 A1* | 8/2005 | Liu | G06K 9/469 |
| | | | 345/581 |
| 2010/0161811 A1* | 6/2010 | Velusamy | G06F 16/9038 |
| | | | 709/228 |
| 2013/0173542 A1* | 7/2013 | Dudgeon | G06F 3/067 |
| | | | 707/626 |
| 2014/0372374 A1* | 12/2014 | Bourbonnais | G06F 16/27 |
| | | | 707/613 |
| 2016/0232191 A1* | 8/2016 | Adrian | G06F 16/23 |
| 2017/0132232 A1* | 5/2017 | Allen | G06F 16/116 |
| 2019/0087123 A1* | 3/2019 | Liljedahl | G06F 9/52 |
| 2019/0155705 A1* | 5/2019 | Chavan | G06F 16/2308 |

* cited by examiner

SYSTEMS AND METHODS FOR ELECTRONIC DATA RECORD SYNCHRONIZATION

RELATED APPLICATION

This patent claims the benefit of U.S. Provisional Patent Application Ser. No. 62/620,855, filed on Jan. 23, 2018, under 35 U.S.C. § 119(e). U.S. Provisional Patent Application Ser. No. 62/620,855 is hereby incorporated by reference in its entirety.

FIELD OF THE DISCLOSURE

This disclosure relates generally to electronic data records, and, more particularly, to systems and methods for electronic data record synchronization.

BACKGROUND

Agencies such as law enforcement agencies often exist at, for example, the city level, the state level, and the federal level. Each agency collects data about individuals with whom the agency interacts (e.g., when investigating a crime, at a traffic stop) and/or objects such as vehicles or guns that form the subject of agency activity. The agencies record the data in electronic records that are stored in one or more databases. In some examples, records generated by, for example, a municipal law enforcement agency are shared with the state and/or federal law enforcement agencies via shared database access between the agencies.

BRIEF DESCRIPTION OF THE DRAWINGS

The figures are not to scale. Wherever possible, the same reference numbers will be used throughout the drawing(s) and accompanying written description to refer to the same or like parts.

Figure 1:
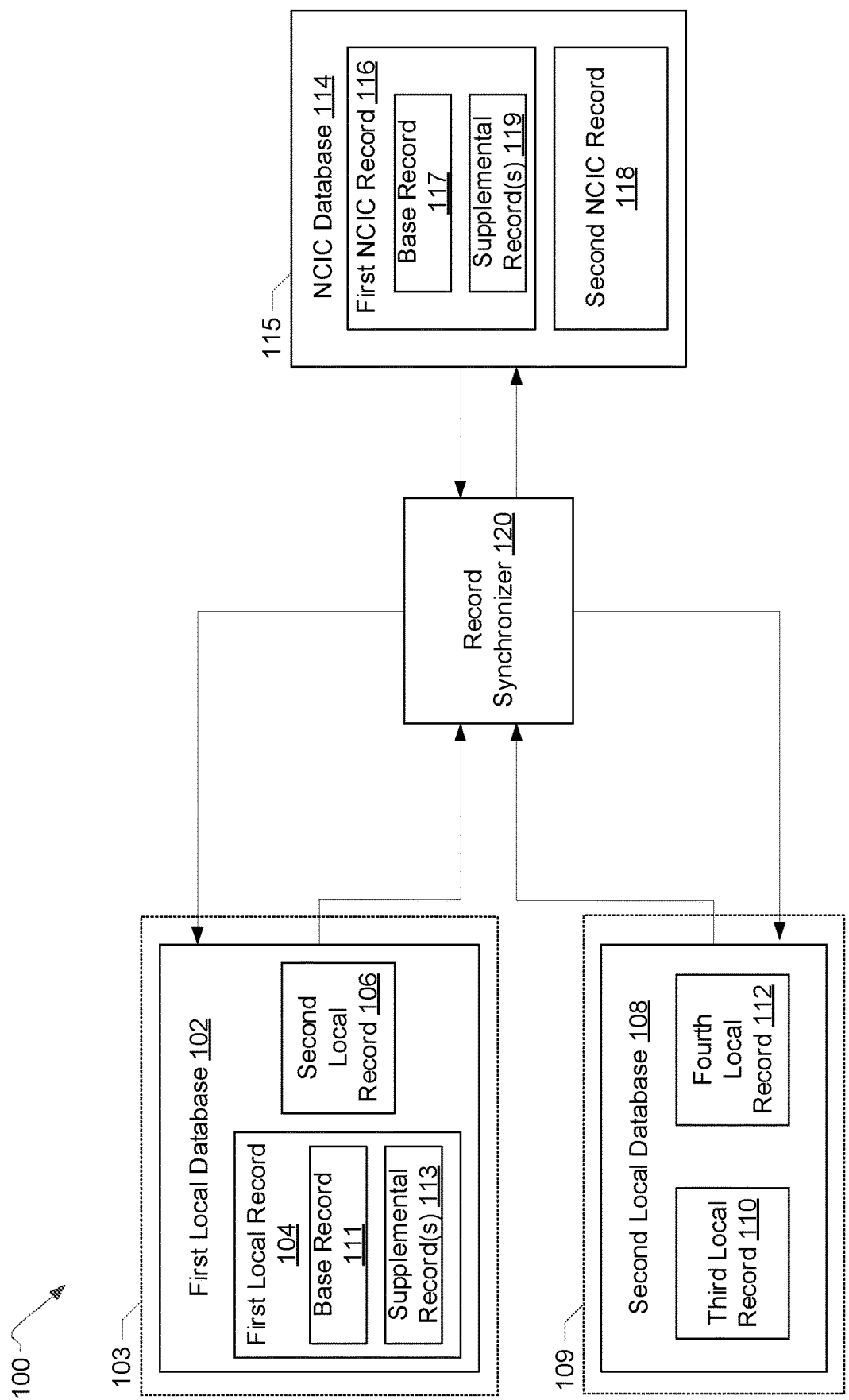
FIG. 1 is a block diagram of an example system constructed in accordance with the teachings disclosed herein and including a record synchronizer for synchronizing data records between two or more databases.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Sharing of data between municipal, state, and federal government agencies, such as law enforcement agencies, is typically based on hierarchical rules that reflect the types of data in which each agency is interested. In some examples, data collected by the municipal law enforcement agency is not shared with the state and/or federal law enforcement agency unless the data meets certain criteria. For example, records generated by a municipal law enforcement agency including unpaid parking tickets may not be shared with state and/or federal law enforcement agencies, whereas records regarding stolen vehicles, arrest warrants, etc. may be shared between the municipal, state, and/or federal agencies.

The National Crime Information Center (NCIC) is an electronic database of criminal justice information that is maintained by the Federal Bureau of Investigation (FBI) and that can be accessed by local, state, and federal law enforcement agencies. The NCIC database includes records of persons (e.g., wanted persons, missing persons, sex offenders) and property (e.g., stolen vehicles, stolen license plates). Data can be sent to the NCIC database by, for example, municipal law enforcement agencies and accessed by federal law enforcement agencies and vice versa.

Records stored in the NCIC database are formatted based on a data model that may differ from a data model in which, for example, records generated at the municipal level are formatted. For example, a local record generated by a municipal law enforcement agency and/or state law enforcement agency can include one or more data fields that are not included in the NCIC database. As another example, the local record may define separate data fields for first, middle, and last names while the NCIC database combines the first, middle, and last names in a single data field. As another example, local records can define associations between data fields that are not recognized by the NCIC database. For example, local records may define a 1:1 association between vehicle and license plate data, whereas the NCIC database may not recognize such an association.

Sharing local record data (e.g., data generated at the municipal and/or state level) with the NCIC database electronically is often inefficient due to the differences in formatting between the local records and the NCIC records. Sharing of local record data may also be inefficient due to a lack of knowledge by local agencies with respect to the data that is already stored in the NCIC database (e.g., because the data is presented in a different manner than the local record(s)). For example, manual review of the NCIC records may be required to verify that the data in the local record was accurately synchronized with the data fields in the NCIC database, is not duplicative data, etc. However, data in the local records can change over time. In some examples, data associated with an individual and/or object (e.g., vehicle) may be generated by different agencies at different times. Some or all of the data from the different agencies may be transferred to the NCIC database. Further, law enforcement officers typically need to access criminal justice data in real-time. Thus, manual review of the NCIC records to synchronize local records with the NCIC database is not an efficient means for processing the volume of data received from local and/or state agencies to update the NCIC database system.

Example systems and methods disclosed herein provide for automated synchronization of local records (e.g., municipal and/or state records) with a database such as the NCIC database. Some examples scan the NCIC database to identify the data currently in the NCIC database and to determine differences in the data relative to the local records. In some examples, the local records are analyzed and parsed to convert the local records into a standardized format for synchronization with the NCIC database. In examples disclosed herein, the local record data is transmitted to the NCIC database for inclusion in the database.

In examples disclosed herein, data including text and/or binary objects such as images, video, audio, document data, etc. received from different municipal and/or state agencies in different formats can be standardized for inclusion in the NCIC database. Thus, some examples disclosed herein transform different record formats into a standardized format for analysis relative to the NCIC record(s). Some examples perform a rules-based analysis of the local records to determine how the data should be processed for submission to the NCIC database. Some examples query the NCIC database to retrieve the data currently in the NCIC database and to efficiently determine which data should be updated and/or entered into the NCIC database. Example systems and methods disclosed herein eliminate or substantially eliminate the need for manual processing of data for inclusion in the NCIC database due to the automated synchronization of data between databases.

Although examples disclosed herein are discussed in the context of the NCIC database, teachings disclosed herein can be utilized in other applications involving data exchanges. As such, the discussion of the NCIC database is for illustrative purposes only and does not limit this disclosure to criminal justice data. Additionally, although examples disclosed herein refer to databases, teachings disclosed herein can be implemented with other types of data stores or repositories for collecting and storing data. Examples disclosed herein can be implemented with data stores structured based on relational data models or non-relational data models (e.g., flat files) as well as data stores that provide for transitory or non-transitory storage.

FIG. 1 illustrates an example system 100 constructed in accordance with the teachings of this disclosure for synchronizing data records. In the example of FIG. 1, a first local database 102 stores one or more local data records generated by, for example, a first municipal law enforcement agency operating in a first municipality. For example, the first local database 102 includes a first local record 104 and a second local record 106. The first local record 104 can include, for example, arrest warrant data for an individual. The second local record 106 can include vehicle data for a vehicle reported as stolen to the first municipal law enforcement agency. The example first local database 102 can be stored in external memory (e.g., a storage device or storage disk) accessible by a processor. For example purposes in FIG. 1, the first local database 102 may be stored at a first local database server 103.

In the example of FIG. 1, a second local database 108 stores one or more local data records generated by, for example, a second municipal law enforcement agency operating in a second municipality. For example, the second local database 108 includes a third local record 110 and a fourth local record 112. The third local record 110 can include information for an individual who received a parking ticket in the second municipality. The fourth local record 112 can include a record indicating that the vehicle reported as stolen to the first municipal law enforcement agency has been found in the second municipality. The example second local database 108 can be stored in external memory (e.g., a storage device or storage disk) accessible by a processor. For example purposes in FIG. 1, the second local database 102 may be stored at a second local database server 109.

The example first local database 102 and/or the second local database 108 can include additional or fewer records and/or different types of records than illustrated in the example of FIG. 1. In some examples, one or more of the first local database 102 and/or the second local database 108 is associated with, for example, a state law enforcement agency.

Also, any of the local records 104, 106, 110, 112 can include a base record 111 and one or more supplemental records 113. The base record 111 can include primary information associated with, for example, an individual such as a social security number assigned to the individual, last known address, a mugshot image, etc. The supplemental record(s) 113 can include information such as additional social security numbers used by the individual, other addresses affiliated with the individual, etc. Although in the example of FIG. 1, the base record 111 and the supplemental record(s) 113 are shown in connection with the example first local record 104, any of the other local record(s) 106, 110, 112 can include a base record and supplemental record(s).

In the example of FIG. 1, the first law enforcement agency may wish to share data in the first local database 102 with a federal agency such as the FBI and/or other agencies, such as the second law enforcement agency. Similarly, the second law enforcement agency may wish to share data in the second local database 108 with the FBI, the first law enforcement agency, etc. In the example of FIG. 1, data can be exchanged between the first local database 102 and/or the second local database 108 and a (e.g., central) database 114, which, for example purposes in FIG. 1 is the NCIC database.

For example, the first municipal law enforcement agency may wish to transmit data in the first local record 104 regarding the arrest warrant to the NCIC database 114 to alert other law enforcement agencies as to the outstanding arrest warrant. In some examples, whether data in a record is selected for transmission to the NCIC database 114 is based on particular (e.g., predefined) criteria. For example, while a state or national law enforcement agency may be interested in the arrest warrant data in the first local record 104 and/or the stolen vehicle information in the second and/or fourth local records 106, 112, the parking ticket data in the third local record 110 may not meet the criteria for data stored in the NCIC database 114.

In the example of FIG. 1, the NCIC database 114 is stored on a NCIC database server 115. The respective local database servers 103, 109 can be communicatively coupled to the NCIC database server 115 via one or more communication links (e.g., wireless connections such as WiFi). As illustrated in FIG. 1, the NCIC database 114 includes a plurality of NCIC records. For example, the NCIC database includes a first NCIC record 116 and a second NCIC record 118. In some examples, one or more of the NCIC records 116, 118 includes data corresponding to or related to data in one or more of the first, second, third, and/or fourth local records 104, 106, 110, 112. For example, the first NCIC record 116 can include the vehicle data for the vehicle reported as stolen in the second local record 106 (e.g., based on data previously shared between the first local database 102 and the NCIC database 114). The NCIC record(s) 116, 118 can include base record(s) 117 and supplemental record(s) 119 as discussed above in connection with the base record(s) 111 and the supplemental record(s) 113 of the local record(s) 104, 106, 110, 112.

In the example of FIG. 1, the record(s) stored in the first local database 102 may have different data field(s) and/or different data field format(s) than the data field(s) and/or data field format(s) of the record(s) in the NCIC database 114. For example, the local records 104, 106 in the first local database 102 can include a data field for speeding tickets received by an individual in the first municipality that is not defined in the NCIC records 116, 118. As another example, the data field format for names in the local records 104, 106 may define separate data fields for first, middle, and last names, whereas the NCIC records 116, 118 include one data field for first, middle, and last names.

In some examples, the local records stored in the second local database 108 have different data fields and/or data field formats than the records stored in the first local database 102 and the records stored in the NCIC database 114. For example, the data fields of the local records 110, 112 in the second local database 108 may accept values including a mixture of lower case and upper case letters whereas the data fields in the first local database 102 and/or the NCIC database 114 may accept only upper case letters.

In the example of FIG. 1, the first and second local database servers 103, 109 are communicatively coupled to the NCIC database server 115 via a record synchronizer 120. The example record synchronizer 120 of FIG. 1 facilitates synchronization of the data in the local record(s) 104, 106, 110, 112 in the first local database 102 and/or second local database 108 with the data in the NCIC record(s) 116, 118. In the example of FIG. 1, the record synchronizer 120 is implemented by one or more processors and/or cloud-based devices (e.g., server(s), processor(s), and/or virtual machine(s)). Appropriate communication paths (e.g., WiFi, Bluetooth, and/or other communication protocols) supported by the locations of the record synchronizer 120 can be established between (1) the record synchronizer 120 and the first local database server 103, (2) the record synchronizer 120 and the second local database server 109, and (3) the record synchronizer 120 and the NCIC database server 115. In some examples, the record synchronizer 120 is located at respective processors associated with the first local database server 103 and the second local database 108. Thus, in some examples, the record synchronizer 120 is locally implemented with respect to the first and second local database servers 103, 109. In other examples, the record synchronizer 120 is located at a central device (e.g., a cloud-based device) that is accessible by the first and second local database servers 103, 109.

The example record synchronizer 120 of FIG. 1 receives one or more requests via, for example, one or more user inputs entered via a processor implementing the record synchronizer 120 or in communication with the record synchronizer 120. The request(s) can include user input(s) requesting that data (e.g., local record data) from the first local database 102 and/or the second local database 108 be transferred to or shared with the NCIC database 114. In other examples, the record synchronizer automatically detects request(s) to synchronize data with the NCIC database 114 based on the modification of data in the local record(s) and saving of the modified data to the local record(s) by the user. In response to the request(s), the example record synchronizer 120 queries the NCIC database 114 to determine whether the data identified for transfer to the NCIC database 114 is already in the NCIC database 114, is a modification of data already in the NCIC database 114, or is new data to be added to the NCIC database 114.

The example record synchronizer 120 parses the local record(s) 104, 106, 110, 112 including the data to be transferred to the NCIC database 114 and formats the local record(s) 104, 106, 110, 112 into a standardized format for comparison with the NCIC record(s) 116, 118. For example, the record synchronizer 120 formats the data field(s) of the local record(s) to reconcile differences between data fields that are composite data field(s) in the NCIC record(s) (e.g., a single name field for first and last name) and separate data fields in the local record(s) (e.g., individual data fields for first name and last name).

The example record synchronizer 120 of FIG. 1 also parses the data in the NCIC record(s) 116, 118 for comparison with the parsed local record(s). For example, a data format rule of the NCIC database 114 may result in the letter "O" being replaced with the number "0" in data fields such as the name data field. The example record synchronizer 120 transforms the NCIC text data including the number "0" to include the letter "O" for comparison with the local record(s), which may not have a similar data format rule. Thus, the example record synchronizer 120 of FIG. 1 standardizes the formats of the local records and NCIC records.

The example record synchronizer 120 compares the values of the data field(s) in the parsed local record(s) to the values of the data field(s) of the parsed NCIC record(s) to identify data field value differences between the local record(s) and the NCIC record(s). For example, the record synchronizer 120 maps the data field(s) in the parsed local record(s) to corresponding NCIC data field(s), if available. The record synchronizer 120 determines whether the values in the mapped data fields are equivalent or different. If the record synchronizer 120 determines that the data field values are different, the record synchronizer 120 identifies the data field as a data field to be modified at the NCIC database 114. The record synchronizer 120 compares each mapped data field to generate set of data fields to be modified at the NCIC database 114.

After determining the set of data fields that are to be modified in the NCIC database 114, the example record synchronizer 120 of FIG. 1 determines a sequence in which messages including the data field value modifications (e.g., revisions, additions, deletions) should be sent to the NCIC database server 115 for synchronization with the NCIC database 114. As discussed above, respective local record(s) in the first and/or second local databases 102, 108 can include a base record 111 and one or more supplemental records 113. Similarly, the NCIC record(s) 116, 118 can include a base record 117 and one or more supplemental records 119. As discussed herein, the example record synchronizer 120 of FIG. 1 applies particular (e.g., predefined) rules to determine an order of transactions in which the record synchronizer is to send messages to the NCIC database server 115 based on whether the data to be transmitted is in the base record(s) 111, 117 or in the supplemental record(s) 113, 119.

In some examples, the record synchronizer 120 of FIG. 1 formats the data that is to be modified at the NCIC database 114 prior to transmitting the data to the NCIC database server 115. For example, the record synchronizer 120 may convert the letter "O" in text data in the local records to the number "0" in accordance with the data format rules of the NCIC database 114.

As discussed above, the example record synchronizer 120 of FIG. 1 is communicatively coupled to the NCIC database server 115 (e.g., via one or more wireless or wired communication protocols). The record synchronizer 120 transmits one or more transaction messages defining the local record data to be synchronized (e.g., modified, inserted into) with the NCIC record data to the NCIC database server 115. In some examples, the record synchronizer 120 transmits the transaction message(s) to the NCIC database server 115 based on one or more processing rule(s) that define sequence(s) in which transaction messages are to be sent to the NCIC database server to ensure that the record(s) of the NCIC database align with the record(s) of the local record database after synchronization.

The example record synchronizer 120 of FIG. 1 waits for a response from the NCIC database server 115 confirming that the data has been updated in the NCIC database 114 (e.g., in one or more of the NCIC record(s)) based on the transaction message(s). In some examples, after receiving the confirmation response from the NCIC database server 115, the record synchronizer 120 parses the NCIC record(s) including the modified data and performs a comparison of the updated, parsed NCIC record data to the parsed local record data to verify that all of the data has been synchronized. If no further changes are detected between the data fields of the parsed records, the record synchronizer 120 updates the status of the transaction message(s) to indicate that the local record data was successfully synchronized at NCIC database 114. The example record synchronizer 120 of FIG. 1 deletes any temporary data generated as part of, for example, the parsing of data of the local record(s) 104, 106, 110, 112 and the NCIC record(s) 116, 118. In other examples, if the record synchronizer 120 identifies differences in data field values between the local record data and the updated NCIC record data, the record synchronizer 120 marks the corresponding transaction message(s) with an error flag to indicate the synchronization was not successful. In some examples, the error flag(s) may be viewed by a user to verify the status of synchronization.

In some examples, each record 116, 118 in the NCIC database 114 is assigned a NCIC record identifier. The example record synchronizer 120 of FIG. 1 updates the local record(s) 104, 106, 110, 112 with the NCIC record identifiers to increase the efficiency of the synchronizations of local record data with the NCIC database 114 at future times. For instance, upon receiving a request to share local record data with the NCIC database 114, the example record synchronizer can recognize that the local record data is already in the NCIC database based on the NCIC record identifier. In some examples, the record synchronizer 120 updates the list of NCIC record identifiers in substantially real-time prior to sending a transaction message with instructions to add a new NCIC record to the NCIC database 114 to reduce instances of duplicate transaction messages including corrections or modifications from being sent to the NCIC database 114 by different local databases.

In some examples, the record synchronizer 120 of FIG. 1 monitors data updated at the NCIC database 114 and updates the local record(s) 104, 106, 110, 112 at one or more of the local databases 102, 108. For example, the record synchronizer 120 can transmit the data from the second local record 106 in the first local database 102 indicating that a vehicle was stolen to the NCIC database 114, which may result in the creation of a NCIC record identifying the vehicle status as stolen. At a later time, the vehicle status in the NCIC record may be updated to indicate that the vehicle has been found based on, for example, data in the fourth local record 112 of the second local database 108. In such examples, the record synchronizer 120 of FIG. 1 detects the update to the vehicle status at the NCIC database 114. The record synchronizer 120 generates a message to send to the first local database server 103 indicating that the vehicle has been found. Thus, in some examples, the record synchronizer 120 serves as a hub for managing data between the local database(s) 102, 108 and the NCIC database 114.

Figure 2:
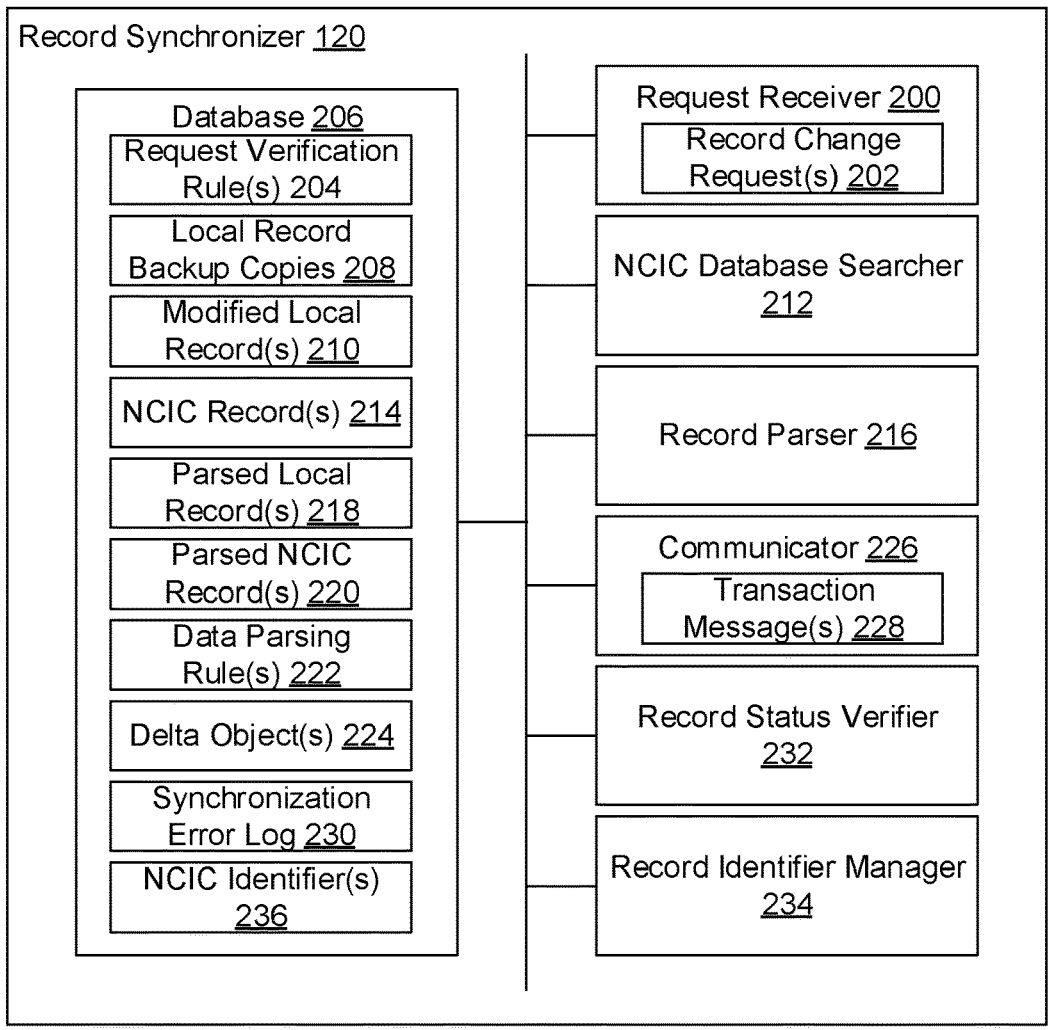
FIG. 2 is a block diagram of an example implementation of the record synchronizer of FIG. 1.

FIG. 2 is a block diagram of an example implementation of the example record synchronizer 120 of FIG. 1. As mentioned above, the example record synchronizer 120 is constructed to synchronize data between a first database (e.g., the first local database 102 of FIG. 1, the second local database 108 of FIG. 1) and a second database (e.g., the NCIC database 114 of FIG. 1). In the example of FIG. 2, the record synchronizer 120 is implemented by one or more processors and/or cloud-based devices (e.g., server(s), processor(s), and/or virtual machine(s)).

The example record synchronizer 120 of FIG. 2 includes a request receiver 200. The example request receiver 200 receives one or more record change requests 202 from, for example, one or more processors in communication with the first and/or second local database servers 103, 109. A record change request 202 can include a copy of a local record (e.g., the local record(s) 104, 106, 110, 112) including data to be modified (e.g., added, replaced, deleted) at the NCIC database 114. In some examples, the record change request(s) 202 include a portion of the local record(s) 104, 106, 110, 112 including the data to be modified. In other examples the record change request(s) 202 include all or substantially all of the data in the local record(s), including modified and unmodified record data.

Upon receipt of a request(s) 202, the request receiver 200 validates the request(s) 202 to verify there are no errors such as transmission of a local record including only empty data fields. The request receiver 200 applies one or more request verification rule(s) 204 to validate the request(s) 202. The request verification rule(s) 204 can be defined by, for example, one or more user inputs received by the record synchronizer 120 and stored in a database 206 of the example record synchronizer 120 of FIG. 2. If the request receiver 200 detects error(s) in the record change request(s) 202, the request receiver 200 generates error message(s). In some examples, the error message(s) can be delivered for display to one or more user(s) (e.g., via the processor(s) at which the request(s) 202 were generated).

As mentioned above, the example record synchronizer 120 of FIG. 2 includes the database 206. In other examples, the database 206 is located external to the record synchronizer 120 in a location accessible to the record synchronizer 120. If the request receiver 200 determines that the record change request(s) 202 are valid, the request receiver 200 creates backup copies 208 of the local record(s) 104, 106, 110, 112 associated with the request(s) 202. The backup copies 208 of the local record(s) can be stored in the database 206.

The example request receiver 200 of FIG. 2 generates modified local record(s) 210 based on the changes to data as indicated in the record change request(s) 202. The modified local record(s) 210 can be stored in the example database 206. In the example of FIG. 2, the request receiver 200 verifies that the modified local record(s) 210 do not contain errors based on the request verification rule(s) 204. For example, the request receiver 200 can verify that a modified local record 210 does not contain a text value in a data field that is a numerical field. If the request receiver 200 detects error(s) in the modified local record(s) 210, the request receiver 200 generates error message(s) to be delivered to the requestor(s). In some such examples, the request receiver returns a modified local record 210 including an error to its original state based on the corresponding backup copy 208 of the record. If the request receiver 200 does not detect any error(s) in the modified local record(s) 210, the request receiver 200 flags the modified local record(s) 210 for synchronization with the NCIC database 114.

The example request receiver 200 of FIG. 2 analyzes the modified local record(s) 210 to determine if the record(s) include NCIC identifier(s), such as a NCIC record identifier. For instance, a NCIC identifier is assigned to a record that has been previously added to the NCIC database 114. In the example of FIG. 2, if the request receiver 200 determines that the modified local record(s) 210 include NCIC identifier(s), the record synchronizer 120 initiates a search of the NCIC database 114 to retrieve the local record data stored in the NCIC database 114. In some examples, the request receiver 200 identifies a particular combination of data fields, such as name, date of birth, and social security number in the modified local record(s) 210 in addition to or as an alternative to the NCIC identifier(s).

The example record synchronizer 120 of FIG. 2 includes a NCIC database searcher 212. The NCIC database searcher 212 queries the NCIC database 114 to determine what local record data is currently in the NCIC database 114. For example, if the local record data to be shared with the NCIC database 114 includes arrest warrant data, the NCIC database searcher 212 generates a query to search for arrest warrant records stored in the NCIC database 114. In some examples, the request receiver 200 automatically instructs the NCIC database searcher 212 to query the NCIC database 114 based on the flagging of the modified local record(s) 210 for synchronization. In other examples, the NCIC database searcher 212 generates the queries in response to a user request to initiate the synchronization.

In response to querying the NCIC database 114, the NCIC database searcher 214 receives one or more NCIC records 214 from the NCIC database 114 corresponding to the search criteria. In some examples, the NCIC record data received in response to the search is stored in the database 206.

In other examples, the record synchronizer 120 stores mirrored copies of one or more records in the NCIC database in the example database 206. The mirrored copies can be based on records previously updated via the record synchronizer 120 at the NCIC database 114 or records previously retrieved by the NCIC database searcher 212. In such examples, the example record synchronizer of FIGS. 1 and 2 may use the mirrored record copies to identify data to be synchronized or added between the local and NCIC databases (e.g., instead of querying the NCIC database).

In some examples, the request receiver 200 may determine that the local record(s) associated with the record change request(s) do not include NCIC identifier(s) (and/or the particular combination of data fields). In such examples, the request receiver 200 determines that the local record data associated with record change request(s) 202 should be added to the NCIC database 114 as a new NCIC record. For example, a record change request 202 may include arrest warrant data for a new arrest warrant. In such examples, the request receiver 200 flags the modified local record 210 as a new record to be added to the NCIC database. In some such examples, because the request receiver 200 has determined that a new NCIC record is to be created at the NCIC database 114, the NCIC database searcher 212 does not search the NCIC database 114 for the record data. Thus, in some examples, the record synchronizer 120 of FIG. 2 conserves processing resources by refraining from searching the NCIC database 114 if the request receiver 200 determines that there is no NCIC identifier associated with a local record. In other examples, the NCIC database searcher 212 queries the NCIC database 114 whether or not the local record(s) include NCIC identifier(s).

The example record synchronizer 120 of FIG. 2 includes a record parser 216. The example record parser 216 of FIG. 2 analyzes the modified local record(s) 210 and the NCIC record(s) 214 resulting from the search of the NCIC database 114 to identify the data field(s) in the NCIC record(s) 214 that are to be synchronized with the data field(s) in the local record(s). The example record parser 216 analyzes the NCIC record(s) 214 obtained from the search of the NCIC database 114. The example record parser 216 confirms that data corresponding to the local record data is in the NCIC database 114 based on, for example, the NCIC identifier associated with the modified local record(s) 210. If the record parser 216 does not find the local record data in the NCIC record(s) 214, the record parser 216 flags the modified local record(s) 210 for insertion into the NCIC database 114.

If the record parser 216 determines that local record data associated with the modified local record(s) 210 is in the NCIC database 114, the record parser 216 parses the modified local record(s) 210 and the corresponding NCIC record(s) 214 to compare data between the records 210, 214. The record parser 216 creates temporary parsed local record(s) 218 for each of the modified local record(s) 210 and temporary parsed NCIC record(s) 220 for each of the NCIC record(s) 214. In the example of FIG. 2, data in the data field(s) of the parsed local record(s) 218 and data in the data field(s) of the parsed NCIC record(s) 220 have the same data formats to facilitate comparison of the data between the records.

The example record parser 216 generates the parsed local record(s) 218 and the parsed NCIC record(s) 220 based on one or more data parsing rule(s) 222. The data parsing rule(s) 222 can be stored in the database 206. For example, the record parser 216 of FIG. 2 maps the data field(s) in the modified local record(s) 210 to known NCIC data field(s) based on the rule(s) 222. In some examples, the data parsing rule(s) 222 include instruction(s) for the record parser 216 to skip a data field in the modified local record(s) 210 if the data field is not a NCIC data field (e.g., a parking ticket data field). In some examples, the rule(s) 222 include instruction(s) for the record parser 216 to map more than one data field to a NCIC data field if the NCIC data field is a composite data field (e.g., a single data field for first and last name).

In some examples, the record parser 216 formats the value(s) (e.g., text, numerical values) of the data field(s) of the modified local record(s) 210 as part of mapping the data field(s) relative to the NCIC data field(s). For example, the data parsing rule(s) 222 can include rule(s) regarding the treatment of capitalization of letters, rules regarding the order of presentation text in a data field (e.g., an order of presenting first name and last name), etc. In some examples, the data parsing rule(s) 222 include rules based on data formats used by a particular local record database (e.g., the first or second local database 102, 108 of FIG. 1). In other examples, the data parsing rule(s) 222 are universal rule(s) to be applied to, for example, substantially all local record data.

As mentioned above, in some examples, the record parser 216 parses textual data. In some examples, the record parser 216 may interpret, for example, data in XML format or JSON format based on the data parsing rule(s) 222. In other examples, the record synchronizer 120 may be able to directly access data records stored in a central database such as the NCIC database. In some such examples, the record parser 216 formats and/or applies one or more or the rule(s) 222 to the data directly accessed from the NCIC database to enable the record synchronizer 120 to, for instance, compare the data directly accessed from the NCIC database with the data from the local database(s).

The example record parser 216 compares the data field(s) of the parsed local record(s) 218 with the data field(s) of the parsed NCIC record(s) 220. In the example of FIG. 2, if the record parser 216 determines that a value in a data field of a parsed local record 218 is equal to a value in a corresponding data field of a parsed NCIC record 220, then the example record parser 216 determines that the data field does not require synchronization. If the record parser 216 determines that a value in a data field in the parsed local record 218 is different than a value in a corresponding data field of the parsed NCIC record 220, the record parser 216 identifies the data field as a data field that requires synchronization.

The example record parser 216 generates a delta object 224 including the data field(s) that the record parser 216 identifies in parsed local record 218 as requiring synchronization with the corresponding NCIC record. The delta object(s) 224 can be stored in the example database 206. The delta object(s) 224 can include data field identifier(s) (e.g., the name or abbreviation of the data field(s) in the NCIC record), value(s) of the data field(s) in the parsed local record 218, and value(s) of the data field(s) in the parsed NCIC record 220 (e.g., current value(s) prior to synchronization). In some examples, the delta object(s) 224 include empty field(s) to delete data from a NCIC base record. In some examples, the delta object(s) include a status indicator for each data field to indicate whether the new or modified data value has been synchronized with the NCIC database, is pending synchronization, previously encountered a synchronization error, etc. In some examples, the delta object(s) 224 only include data field(s) having value(s) that differ between the local record(s) and the NCIC record(s). In other examples, the delta object(s) also include data field(s) that do not require synchronization. In such examples, the delta object(s) 224 can include a designation (e.g., "null") to indicate that there is there is no change between the value(s) of the data field(s) in the local and NCIC record(s). Thus, the example record synchronizer 120 of FIG. 2 determines the local record data field(s) to be synchronized with the NCIC record data field(s) based on the delta object(s) 224 generated by the record parser 216.

The example record synchronizer 120 of FIG. 2 includes a communicator 226. The example communicator 226 identifies the data to be synchronized with the NCIC database 114 in a delta object 224. The example communicator 226 generates one or more transaction message(s) 228 to be sent to the NCIC database server 115 based on the delta object(s) 224. An example transaction message 228 can include a NCIC record identifier, a data field identifier, and the value of the data field to be updated (e.g., modified, replaced) in the corresponding NCIC record stored in the NCIC database 114. The example communicator 226 generates a transaction message 228 for one or more data fields identified in a delta object 224 as requiring synchronization. Thus, the example record synchronizer 120 efficiently uses network resources by only sending data in a local record that is to be updated to the NCIC database server 115 rather than all of the data in a local record.

In examples where the data in the parsed local record(s) 218 is new data to be added to a NCIC record (e.g., as compared to data that is to be updated) and/or in examples where a new NCIC record is to be created based on the local record data, the communicator 226 generates the transaction message(s) 228 instructing the data to be added to the NCIC database 114.

In some examples, instead of generating the transaction messages based on the parsed local record(s) 218 and/or differences between the NCIC and local records identified by the record parser 216, the communicator 228 generates a transaction message to cancel a NCIC record that is to be updated in its entirety. In such examples, the communicator 228 generates additional transaction message(s) including all of the record data (i.e., including the modified or new data to be synchronized) to re-enter the record at the NCIC database in its entirety.

In some other examples, the communicator 226 transmits transaction message(s) 228 to the NCIC database server including data to be updated at the NCIC database without the NCIC database searcher searching the NCIC database. In such examples, if the communicator 226 receives a message that the record to be updated was not found at the NCIC database, the communicator 226 can send transaction message(s) to add the record to the NCIC database.

For each transaction message 228, the example communicator 226 waits for a response from the NCIC database server 115 confirming that the data field value(s) have been updated and/or added to the NCIC database 114 such that the value(s) correspond to the value(s) in the modified local record(s) 210 for a given data field. In some examples, the communicator 226 generates two or more transaction message(s) 228 that are to be sent to the NCIC database server 115. In some such examples, the communicator 226 of FIG. 2 waits for a confirmation response from the NCIC database server 115 before transmitting another transaction message 228 to the NCIC database server 115. In other examples, the communicator 226 sends two or more transaction messages 228 to the NCIC database server 115 at substantially the same time. In some examples, the number of transaction message(s) 228 sent by the communicator 226 to the NCIC database server 115 is based on a particular (e.g., predefined) threshold in view of, for example, available resources of the NCIC database server 115, server response times, etc.

The example communicator 226 of FIG. 2 continues to send the transaction message(s) 228 to the NCIC database server 115 until (1) there no further data field values in a particular delta object 224 to be synchronized with the NCIC database 114, or (2) the communicator 226 receives an error message from the NCIC database server 115 in response to the transmission of one of the transaction messages 228. For example, the NCIC database server 115 may transmit an error message to the communicator 226 indicating that the synchronization was not completed due to, for example, a shortage of network resources available at the NCIC database server 115. If the example communicator 226 of FIG. 2 receives an error message from the NCIC database server 115, then the communicator 226 flags the transaction message 228 associated with the error message as an incomplete transaction. In some examples, the communicator 226 of FIG. 2 refrains from sending further transaction message(s) 228 for the particular delta object 224 associated with the error message. In some examples, the communicator 226 attempts to send other transaction message(s) 228 despite receiving the error message(s) for previously sent transaction message(s). In other examples, the communicator 226 attempts to re-send the transaction message(s) 228 associated with the error message(s) at a later time. In some examples, in response to an error message, the communicator 226 divides up a transaction message that includes a plurality of data field values to be synchronized into two or more transaction messages. In such examples, the communicator 226 sends the newly divided transaction messages to the NCIC database server 115. For example, the communicator 226 can divide a transaction message including data for five data fields into five separate transaction messages for transmission to the NCIC database server 115.

The example communicator 226 records the transaction message(s) 228, the record change request(s) 202, and/or the local record(s) (e.g., the local record(s) 104, 106, 110, 112 of FIG. 1) associated with synchronization error(s) in a synchronization error log 230. The synchronization error log 230 can be stored in the example database 206 of FIG. 2.

In the example of FIG. 2, a user can view the synchronization error log 230 via, for example, a graphical user interface associated with a processor implementing the record synchronizer 120 or in communication with the record synchronizer 120. The user can identify the data field(s) in the local record(s) that did not synch properly based on the synchronization error log 230. In some examples, the communicator 226 refrains from transmitting (or re-transmitting) transaction message(s) 228 to the NCIC database server 115 until receiving further user instructions.

The example record synchronizer 120 of FIG. 2 includes a record status verifier 232. The example record status verifier 232 monitors a status of the synchronization for each data field identified in a delta object 224 as requiring synchronization. The record status verifier 232 assigns statuses to, for example, the transaction message(s) 228 indicating whether the message(s) are queued for delivery, whether the message(s) have been sent to the NCIC database server 115, whether confirmation response(s) have been received from the NCIC database server 115 indicating that synchronization is complete, etc.

When there are no more transaction message(s) 228 to be transmitted to the NCIC database server 115 for a particular delta object 224 (and no error messages have been received from the NCIC database server 115), the example record synchronizer 120 verifies that the local record data field value(s) have been correctly updated and/or added to the corresponding NCIC record(s) at the NCIC database 114. For example, the NCIC database searcher 212 queries the NCIC database 114 to obtain the updated NCIC record(s) 214 after the transaction message(s) 228 have been sent to and processed by the NCIC database server 115. The example record parser 216 parses the updated NCIC record(s) 214 and compares the updated, parsed NCIC record(s) 220 to the parsed local record(s) 218. The example record parser 216 generates delta object(s) 224 based on the comparison. In the example of FIG. 2, the example record status verifier 232 analyzes the delta object(s) 224 generated by the record parser 216 based on the updated NCIC record(s). The example record status verifier 232 determines if the delta object(s) 224 indicate differences between data field value(s) in the local record(s) and the NCIC record(s) or if the delta object(s) 224 indicate that there are no differences between the data field value(s) of the respective local and NCIC records (e.g., based on "null" indicator(s) for each of the data fields in the delta object(s) 224 indicating that the data field value(s) are equivalent between records). If there are no differences between the local record(s) and the NCIC record(s), the example record status verifier 232 determines that the synchronization was successful. In some such examples, the example record status verifier 232 updates the status of the record change request(s) 202 and/or the local record(s) (e.g., at the respective local database(s) 102, 108) to indicate that the data in the local record(s) has been synchronized with the NCIC database 114.

If the example record status verifier 232 determines that the delta object(s) 224 generated based on the updated NCIC records indicates differences between the value(s) of the data field(s) of the local and NCIC record(s), the record status verifier 232 records error message(s) in the synchronization error log 230 for the local record(s) that were not successfully synchronized. In some examples, in the view the synchronization error(s), the example record status verifier 232 instructs the communicator 226 not to send further transaction message(s) 228 until further user instructions are received via one or more user input(s). In other examples, as disclosed above, the record status verifier 232 can instruct the communicator 226 to re-send the transaction messages at a later time, to divide up a transaction message in multiple transaction messages, etc.

The example record synchronizer 120 of FIG. 2 includes a record identifier manager 234. The example record identifier manager 234 records NCIC identifier(s) 236 generated at the NCIC database 114 in response to the transaction messages(s) 228 that include data to be added to the NCIC database 114. The NCIC identifier(s) 236 can be generated in response to the creation of a new NCIC record, the addition of binary objects (e.g., image data (e.g., still image data, video data), audio data (e.g., MP3 data)) to a NCIC record, etc. The NCIC identifier(s) 236 can be stored in the database 206 of the example record synchronizer 120.

In examples in which a NCIC identifier 236 is associated with a new NCIC record created at the NCIC database 114, the example communicator 226 transmits the NCIC identifier 236 (e.g., a record identifier including, for example name and original agency case number) to the local database 102, 108 that stores the corresponding local record for which the NCIC record was generated. In such examples, the local record(s) are updated with the NCIC identifier(s) via the record synchronizer 120 of FIG. 2 to facilitate synchronization between the NCIC record(s) and the local record(s). As another example, when a binary object such as an image is added to the NCIC record (e.g., based on an image from the local record), the record identifier manager 234 identifies the NCIC identifier (e.g., an image number) assigned to the image by the NCIC database 114 and transmits the image number to the local database for storage in the corresponding local record.

In some examples, the record synchronizer 120 uses the NCIC identifier(s) 236 to increase efficiency of synchronizing the local record(s) and the NCIC record(s). For example, when the example request receiver 200 receives a request 202 including local record data to be shared with the NCIC database 114, the NCIC database searcher 212 can search the NCIC identifier(s) 236 stored in the database 206 to determine if the request 202 is associated with a record is already stored in the NCIC database 114. The NCIC database searcher 212 can use such information to facilitate querying of the NCIC database 114. In some examples, the database 206 of FIG. 2 includes information about the synchronization status of the local record(s) associated with the NCIC identifier(s) 236, such as the last time data was synchronized with the NCIC database 114 for the record (e.g., based on statuses recorded by the record status verifier 232).

In some examples, the example record synchronizer 120 of FIG. 2 uses the NCIC identifier(s) 236 to detect when a NCIC record has been updated by a first local database and to transmit the updated data to a second local database storing corresponding local record data. For example, the example request receiver 200 can receive a request to receive to update a vehicle status data field value associated with the second local record 105 of FIG. 1 to indicate that a vehicle was reported as stolen. The vehicle status data field value may be updated in the corresponding NCIC record as substantially discussed above (e.g., via the generation of a delta object 224 and transmission of a transaction message 228 to the NCIC database server 115). In some examples, the NCIC database searcher 212 determines that the NCIC record corresponding to the second local record 106 was updated at the NCIC database 114 based on a data from the second local database 108. For example, the vehicle status data field value in the NCIC record may indicate that the vehicle was found based on data received from the second local database 108. In such examples, the example communicator 226 of FIG. 2 can transmit a message to the first local database 102 to enable the vehicle status data field in the second local record 106 to be updated to reflect that the vehicle has been found.

In the example of FIG. 2, after the record status verifier 232 receives confirmation that the local record data has been updated and/or added to the NCIC database 114, the record parser 216 deletes the temporary parsed local record(s) 218 and the temporary parsed NCIC record(s) 220 from the database 206. Thus, the example record synchronizer 120 of FIG. 2 efficiently uses resources to identify differences between the local and NCIC records via the temporary parsed records without consuming extensive memory resources.

Figure 3:
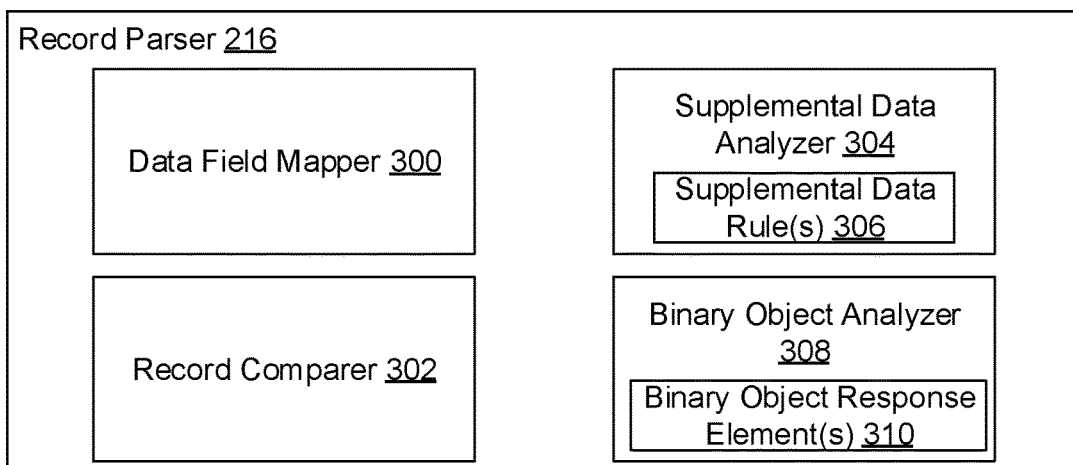
FIG. 3 is a block diagram of an example record parser of the example record synchronizer of FIGS. 1 and 2.

FIG. 3 is a block diagram of an example implementation of the example record parser 216 of FIG. 3. As discussed above, the example record parser 216 parses the local record(s) and the NCIC record(s) to identify differences in data field value(s) between the records and to generate the delta object(s) 224 including data to be sent to the NCIC database server 115 for synchronization.

The example record parser 216 of FIG. 3 includes a data field mapper 300. The example data field mapper 300 applies the data parsing rule(s) 222 to generate the parsed local record(s) 218 and the parsed NCIC record(s) 220. For example, the data field mapper 300 maps the data fields in the modified local record(s) 210 to corresponding data fields in the NCIC record(s). In some examples, the data field mapper 300 combines two or more data fields to account for composite data fields. In some other examples, the data field mapper 300 maps one data field in a modified local record 210 to two or more data fields in a NCIC record. In some examples, the data field mapper 300 formats text and/or numerical data values to address differences in data formatting models between the local and NCIC record(s). Thus, the example data field mapper 300 reconciles data field and/or data formatting differences between the local and NCIC records to enable comparison of the data between the records.

The example record parser 216 of FIG. 3 includes a record comparer 302. The example record comparer of FIG. 3 compares the values in the respective mapped data fields of the parsed local record(s) 218 and the parsed NCIC record(s) 220. The example record comparer 302 of FIG. 3 determines whether the values in the respective data fields are equivalent. The record comparer 302 does not take further action with respect to the data fields identified as having equivalent values between the local and NCIC records because the record comparer 302 determines that the data fields are already synchronized.

In the example of FIG. 3, if the record comparer 302 determines that there are differences between the values in the respective mapped data fields of the parsed local record(s) 218 and the parsed NCIC record(s) 220, the record comparer 302 flags the data field(s) for synchronization. The example record comparer 302 generates a delta object 224 for a particular local record including the data field(s) flagged by the record comparer 302, the values to be added or updated at the NCIC database 114, etc. In some examples, the record comparer 302 iteratively adds the data field(s) and corresponding values to a delta object 224 as the record comparer 302 compares each of the mapped data fields in the parsed records 218, 220. Thus, the record comparer 302 records the data field(s) to be added and/or updated based on the comparison of the mapped data fields in the local and NCIC records.

In some examples, the record comparer 302 determines that two or more data fields in a local record are to be updated at the NCIC database 114. Also, as discussed above, in some examples, the local record and/or the corresponding NCIC record include a base record 111, 117 and one or more supplemental records 113, 119. In such examples, the record parser 216 determines a sequence in which the transaction messages 228 corresponding to the data fields to be synchronized are sent to the NCIC database server to ensure that the base and supplemental records of the NCIC record are aligned with the base and supplemental records of the local record after synchronization.

The example record parser 216 of FIG. 3 includes a supplemental data analyzer 304. The example supplemental data analyzer 304 detects if a parsed local record 218 includes a base record and one or more supplemental records. The example supplemental data analyzer 304 detects if a parsed NCIC record 220 includes a base record and one or more supplemental records. If the parsed local record 218 and/or the parsed NCIC record 220 include base record(s) and supplemental record(s), the supplemental data analyzer 304 generates instructions defining a sequence in which the communicator 226 is to send the transaction message(s) 228 to the NCIC database server 115 to update the data in the respective base and supplemental records. The example supplemental data analyzer 304 of FIG. 3 determines the sequence in which the transaction message(s) 228 are to be sent to the NCIC database server based on one or more supplemental data rules 306. In some examples, the supplemental data rule(s) 306 include predefined rules (e.g., based on user inputs) and are stored in the database 206 of the record synchronizer 120 of FIG. 2.

As an example, the supplemental data analyzer 304 may determine that a parsed local record 218 includes a base social security number record and at least one supplemental social security number record. The supplemental data analyzer 304 may determine that the parsed NCIC record 220 includes a NCIC base social security number record and at least one NCIC supplemental social security number record. In some examples, the number of supplemental records associated with the parsed local record 218 and the parsed NCIC record 220 differ. For example, while the NCIC database 114 may accept up to 99 supplemental records for "Also Known As" (AKA) data field per arrest warrant, the local record can include up to 300 supplemental records for the AKA field.

The supplemental data analyzer 304 of FIG. 3 applies the supplemental data rule(s) 306 to determine the sequence in which the base record(s) and/or the supplemental record(s) should be modified at the NCIC database 114. Continuing to refer to the above example involving social security numbers, the example supplemental data analyzer 304 of FIG. 3 determines if the base social security number record for the parsed local record 218 is in one of the NCIC supplemental social security number record(s). If the base social security number record for the local record 218 is in a NCIC supplemental social security number record at the NCIC database 114, the supplemental data analyzer 304 instructs the communicator 226 to send one or more cancel supplemental record messages 228 to the NCIC database server to remove the corresponding NCIC supplemental social security number record.

The example supplemental data analyzer 304 provides user control over which supplemental record data is entered at the NCIC database via the local record(s). For example, as mentioned above, in some examples, the local record includes more supplemental records than allowed by the NCIC database. A user can select which supplemental records (e.g., which of the 300 AKA supplemental records in the example above) to synchronize with the NCIC database and which to maintain at the local database as, for example, historical data.

Also, the example supplemental data analyzer 304 provides for user control over an order in which the supplemental records are entered at the NCIC database. For example, to change an order of the supplemental records at the NCIC database, the example supplemental data analyzer 304 can cancel a first supplemental record identified as being out of order (e.g., based on a user input) and cancel all supplemental records following the first supplemental record. The supplemental data analyzer 304 can transmit (e.g., via the communicator 226) the supplemental records to the NCIC database server in a revised order. For example, a NCIC record for an arrest warrant may include three supplemental vehicle records. The local record can include an additional (e.g., new) supplemental vehicle record. Based on user input(s), the supplemental data analyzer 304 can enter the new supplemental vehicle record as the first supplemental vehicle record by cancelling the three supplemental vehicle records from the NCIC record and re-entering all the supplemental records with the new vehicle supplemental record listed first. In some examples, when any of the supplemental records are identified as out of order, the supplemental data analyzer 304 can cancel all of the supplemental records and re-enter the supplemental records in the preferred order (e.g., based on user input(s)).

The example supplemental data analyzer 304 of FIG. 3 determines if the parsed NCIC record 220 includes other NCIC supplemental social security number records that are not included in the parsed local record 218 (e.g., the local base record and/or the local supplemental record(s)). In some examples, if the example supplemental data analyzer 304 determines that the NCIC record includes NCIC supplemental social security number record(s) that are not a part of the local record, the supplemental data analyzer 304 instructs the communicator 226 to send one or more cancel supplemental record messages 228 to the NCIC database server 115 to remove the NCIC supplemental social security number records that do not correspond to the base or supplemental records of the parsed local record 218. In other examples, the supplemental data analyzer 304 instructs the communicator to send the cancel supplemental record message(s) 228 to the NCIC database server 115 after the supplemental record data that is to be added to the NCIC database has been sent to the NCIC database server.

The example supplemental data analyzer 304 of FIG. 3 determines if there are differences between the base record of the parsed local record 218 and the base record of the parsed NCIC record 220. Continuing to refer to the above example involving social security numbers, the supplemental data analyzer 304 determines if the social security number in the base record of the parsed local record 218 differs from the social security number in the base record of the parsed NCIC record 220. In some examples, the supplemental data analyzer 304 uses data generated by the record comparer 302 when comparing the mapped data fields (e.g., in the base records) to identify the differences between the base records. If the supplemental data analyzer 304 determines that, for example, the social security number in the local base record differs from the social security number in the NCIC base record, the supplemental data analyzer 304 instructs the communicator 226 to send one or more update base record messages 228 to the NCIC database server 115 to update the social security number in the NCIC base record.

The example supplemental data analyzer 304 of FIG. 3 determines if there are any other supplemental records in the parsed local record 218 containing data (e.g., social security numbers) that are not a part of the parsed NCIC record 220. If the supplemental data analyzer 304 determines that the parsed local record 218 includes, for example, social security numbers in local supplemental records that are not in the NCIC supplemental records, the supplemental data analyzer 304 instructs the communicator 226 to send one or more enter supplemental data messages to create NCIC social security number supplemental records corresponding to the local supplemental records. Thus, after the NCIC database is updated, the base and supplemental records of the local record and the NCIC record share the same data field values (e.g., for the social security number field).

Thus, the example supplemental data analyzer 304 of FIG. 3 provides for synchronization of data (e.g., social security numbers) between the respective base and supplemental records of the local and NCIC records. The supplemental data rule(s) 306 are based on requirements of the NCIC database with respect to the treatment of base and supplemental record data. For example, NCIC database rules may dictate that a base record cannot contain an empty data field value. In some examples, the NCIC database server 115 automatically selects or promotes data in a NCIC supplemental record to the NCIC base record if a data field in the NCIC base record does not contain a value. For example, a NCIC base record may have a social security number deleted, however, the NCIC supplemental record(s) contain social security number(s). Accordingly, the NCIC database server 115 may automatically select a social security number from the NCIC supplemental record(s) and add the social security number to the NCIC base record. However, the resulting social security number added to the NCIC base record may not match the social security number in the base record of the corresponding local record. The supplemental data rule(s) 306 reconcile differences between the base and supplemental records in the local and NCIC databases.

The supplemental data analyzer 304 of FIG. 3 also enables data in the NCIC base record to be removed (e.g., based on changes to the local record) while providing control over which data replaces the removed data in the NCIC base record. For example, a NCIC warrant record may include a base vehicle license plate record and three supplemental vehicle license plate records. If the communicator 226 sent a transaction message 228 that results in the deletion of the vehicle license plate data in the NCIC base record, the NCIC database server 115 would automatically promote one of the supplemental vehicle license plate records to the base record. However, the vehicle license plate data promoted to NCIC supplemental record may not correspond to the vehicle license plate data in the local base record. The supplemental data analyzer 304 applies the supplemental data rule(s) 306 to control the data (e.g., the vehicle license plate data) that is added to the NCIC base record.

The supplemental data analyzer 304 also enables modification of supplemental record data at the NCIC database 114. In some examples, the NCIC supplemental record data can only be entered or deleted at the NCIC database 114. In the example of FIG. 3, when the record change request 202 includes a modification to supplemental record data, the example supplemental data analyzer 304 determines the supplemental record cancellation and entry transaction messages to send to the NCIC database server 115 update the NCIC supplemental record. Thus, from the perspective of a user interacting with the example record synchronizer 120 of FIGS. 2 and 3, the supplemental data appears to be modified via one transaction based on record change request 202 rather than via multiple cancellation and entry transaction messages.

The supplemental data analyzer 304 also compensates for restrictions at the NCIC database 114 with respect to a number of data fields that can be sent to the NCIC database server 115 per base record and/or supplemental record. For example, a warrant for an individual known to drive two vehicles requires a base record (e.g., for the first vehicle data) and a supplemental record (e.g., for the second vehicle data). The NCIC database 114 may permit, for example, a warrant record to include up to 99 alias fields. However, the NCIC database server 115 may only permit 9 alias fields to be sent per supplemental record. Thus, a warrant record for an individual with data in 99 alias fields requires a base record and 11 supplemental records. The example supplemental data analyzer 304 of FIG. 3 determines the correct sequence of transaction messages 228 to send to the NCIC database server 115 such that, from the user's perspective, one local record including 99 alias entries is transmitted to the NCIC database 114.

In some examples, the local record(s) and/or the NCIC record(s) include one or more binary objects, such as image(s) (e.g., image(s) of a vehicle associated with the record), document(s) (e.g., Microsoft Word® file(s)), video(s) (e.g., MPEG file(s)), audio (e.g., MP3 file(s)), etc. The example record parser 216 of FIG. 2 parses the text data and the binary object data in the records to generate the delta object(s) 224. However, in some examples in which, for instance, the binary object(s) include image(s), when the NCIC database searcher 212 queries the NCIC database 114, the NCIC record(s) 214 received in response to the query include some, but not all of the data associated with the image(s) in the NCIC record(s) 214. For example, the query response results may include image number(s) assigned to the image(s) and image type data (e.g., mugshots, signatures, identifying images for property) for the image(s) in the NCIC record(s), but not the date(s) of the image(s), the actual image data (e.g. pixel data), etc. Thus, further querying of the NCIC database 114 is required to obtain the full set of data associated with each image to accurately generate the delta object(s) 224.

The example record parser 216 of FIG. 3 includes an binary object analyzer 308. The example binary object analyzer 308 analyzes the NCIC record(s) 214 received by the NCIC database searcher 212 to determine if the NCIC record(s) 214 include any binary object(s). For example, the binary object analyzer 308 determines whether the NCIC record(s) 214 include image data (e.g., NCIC image number, image type data). If the NCIC record(s) 214 include data such as NCIC image number(s), the binary object analyzer 308 analyzes the modified local record(s) 210 and/or the parsed local record(s) 218 to determine if the local record(s) include image(s) assigned the same NCIC image number as the NCIC record(s). Although examples disclosed herein are primarily discussed in connection with image data, examples disclosed herein are not limited to use with image data but can include other types of binary objects, such as audio data.

Continuing to refer to examples in which the binary object(s) including image(s) for illustrative purposes, iff the image local record(s) include image(s) associated with the NCIC image number(s), the binary object analyzer 308 instructs the NCIC database searcher 212 to query the NCIC database 114 for the full image information (e.g., image date, image data (e.g. pixel data)) so that the record parser 216 can compare the NCIC image information relative to the image information in the local record(s). In response to the image data query, the NCIC database server 115 returns one or more binary object response elements 310. In some examples, the binary object response element(s) 310 are stored in the database 206 of FIG. 2.

The image response element(s) 310 include text data and image data. The example binary object analyzer 308 of FIG. 3 extracts the values in the image data fields and the text data fields from the binary object response element(s) 310. In the example of FIG. 3, the data field mapper 300 parses the binary object response element(s) 310 by mapping the image data fields and the text data fields to the local record data. The record comparer 302 compares the values in the image data fields and the text data fields with the local record data substantially as discussed above. In some examples, the local record supports image having, for instance, larger pixel values than the pixel values accepted by the NCIC database (e.g., image data greater than 256×256 pixels). In such examples, the binary object analyzer 308 may crop or scale the image data for comparison and synchronization with the NCIC record(s).

If the record comparer 302 determines that there are differences between, for example, an image in a parsed local record and an image in a parsed NCIC record (e.g., based on the parsed image response element), the record parser 216 instructs the example communicator 226 of FIG. 2 to send transaction message(s) 228 to the NCIC database server 115 to reconcile the differences.

For example, if the values in the image data type field are the same in the local record and the NCIC record (e.g., both data type fields indicate that the images are mugshots) and only the image date is to be updated, the communicator 226 of FIG. 2 sends a modify image message including the data field and corresponding data to be updated in the NCIC record (e.g., the date value). An example modify image message can include the image number, the image type, and the image date is to be updated at the NCIC database.

As another example, if the value of the image type data field is different between a parsed local record and a parsed NCIC record, the communicator 226 of FIG. 2 sends a first message to cancel or remove the image from the NCIC record and a second message to re-add the image at the NCIC database with the updated image type.

As another example, the binary object analyzer 308 may determine that the modified local record(s) 210 and/or the parsed local record(s) 218 do not include any image(s) with matching NCIC image number(s) as the image number(s) in the NCIC record(s) 214. In such examples, the binary object analyzer 308 refrains from instructing the NCIC database searcher 212 to further query the NCIC database 114 for complete image information. Instead, the binary object analyzer 308 instructs the communicator 226 to generate a transaction message 228 to cancel the image in the NCIC record to reconcile the differences between the local record and the NCIC record.

As mentioned above, the example binary object analyzer 308 can instruct the for the communicator 226 to generate transaction message(s) 228 to reconcile differences between the local record and the NCIC record for other types of binary objects, such as audio data, document data, etc. Thus, the example record synchronizer 120 of FIGS. 2 and 3 provides for synchronization of local and NCIC records for multiple types of data, including text, audio, video, etc. to enable comprehensive sharing of data between the databases.

While an example manner of implementing the example record synchronizer 120 of FIG. 1 is illustrated in FIGS. 2 and 3, one or more of the elements, processes and/or devices illustrated in FIGS. 2 and/or 3 may be combined, divided, re-arranged, omitted, eliminated and/or implemented in any other way. Further, the example request receiver 200, the example database 206, the example NCIC database searcher 212, the example record parser 216, the example communicator 226, the example record status verifier 232, the example record identifier manager 234, the example data field mapper 300, the example record comparer 302, the example supplemental data analyzer 304, the example binary object analyzer 308 and/or, more generally, the example record synchronizer 120 of FIGS. 1-3 may be implemented by hardware, software, firmware and/or any combination of hardware, software and/or firmware. Thus, for example, any of the example request receiver 200, the example database 206, the example NCIC database searcher 212, the example record parser 216, the example communicator 226, the example record status verifier 233, the example record identifier manager 234, the example data field mapper 300, the example record comparer 302, the example supplemental data analyzer 304, the example binary object analyzer 308 and/or, more generally, the example record synchronizer 120 of FIGS. 1-3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example request receiver 200, the example database 206, the example NCIC database searcher 212, the example record parser 216, the example communicator 226, the example record status verifier 232, the example record identifier manager 234, the example data field mapper 300, the example record comparer 302, the example supplemental data analyzer 304, the example binary object analyzer 308, and/or the example record synchronizer 120 is/are hereby expressly defined to include a non-transitory computer readable storage device or storage disk such as a memory, a digital versatile disk (DVD), a compact disk (CD), a Blu-ray disk, etc. including the software and/or firmware. Further still, the example record synchronizer 120 of FIGS. 1-3 may include one or more elements, processes and/or devices in addition to, or instead of, those illustrated in FIGS. 2 and/or 3, and/or may include more than one of any or all of the illustrated elements, processes and devices.

Figure 4:
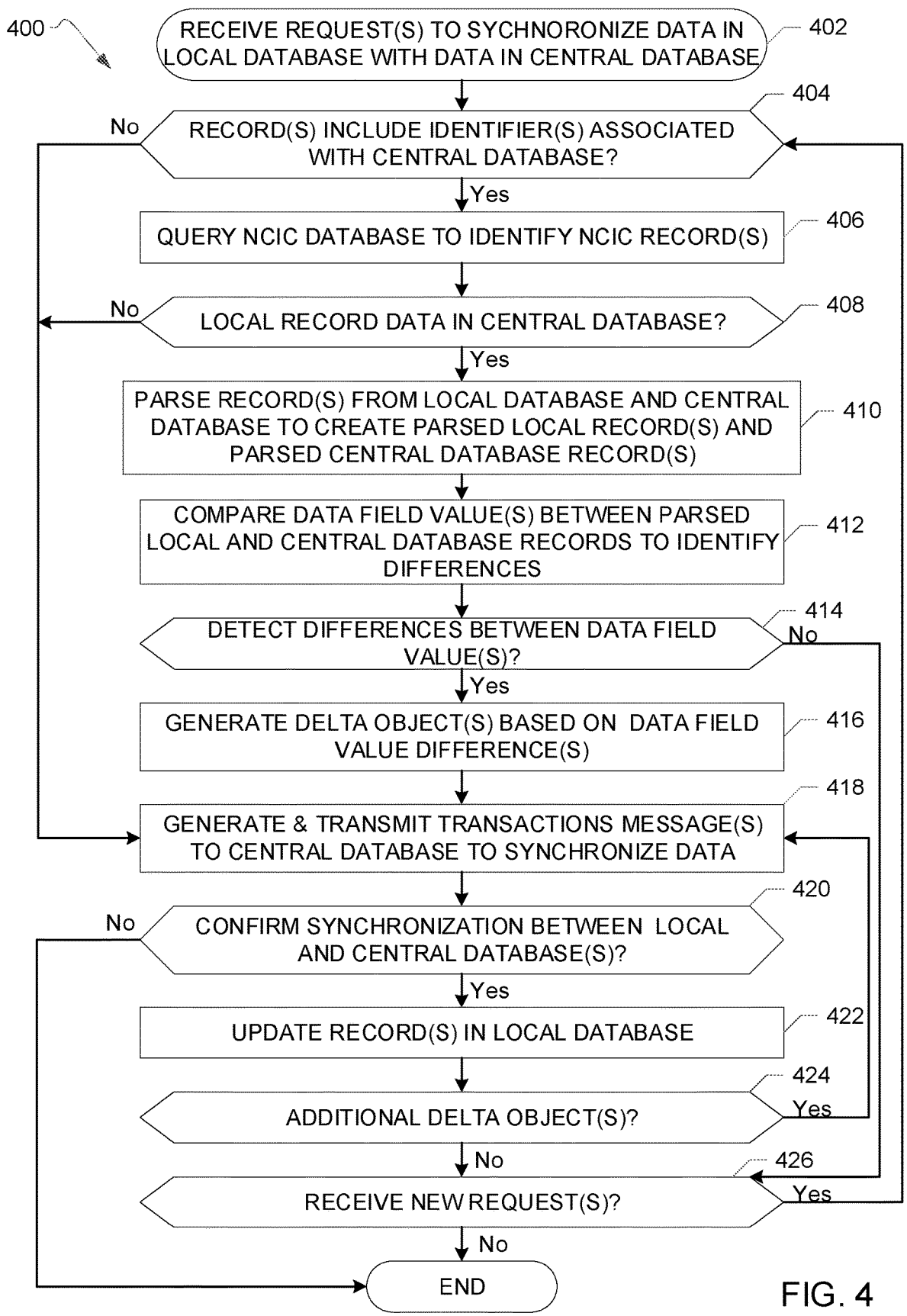
FIG. 4 is a flowchart representative of example machine readable instructions that may be executed to implement the example system of FIGS. 1-3.
Figure 5:
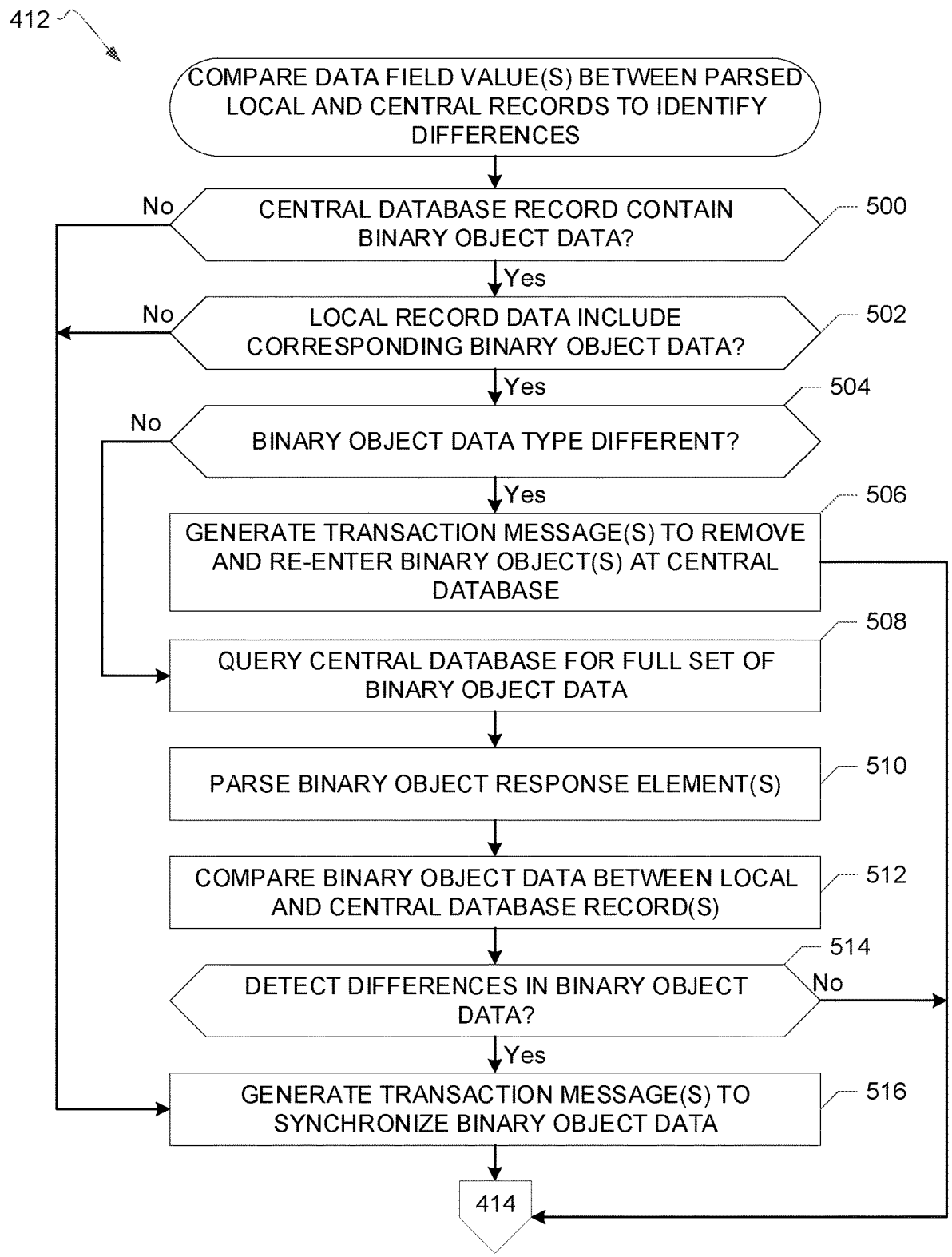
FIG. 5 is a flowchart representative of example machine readable instructions that may be executed to implement block 412 of FIG. 4.
Figure 6:
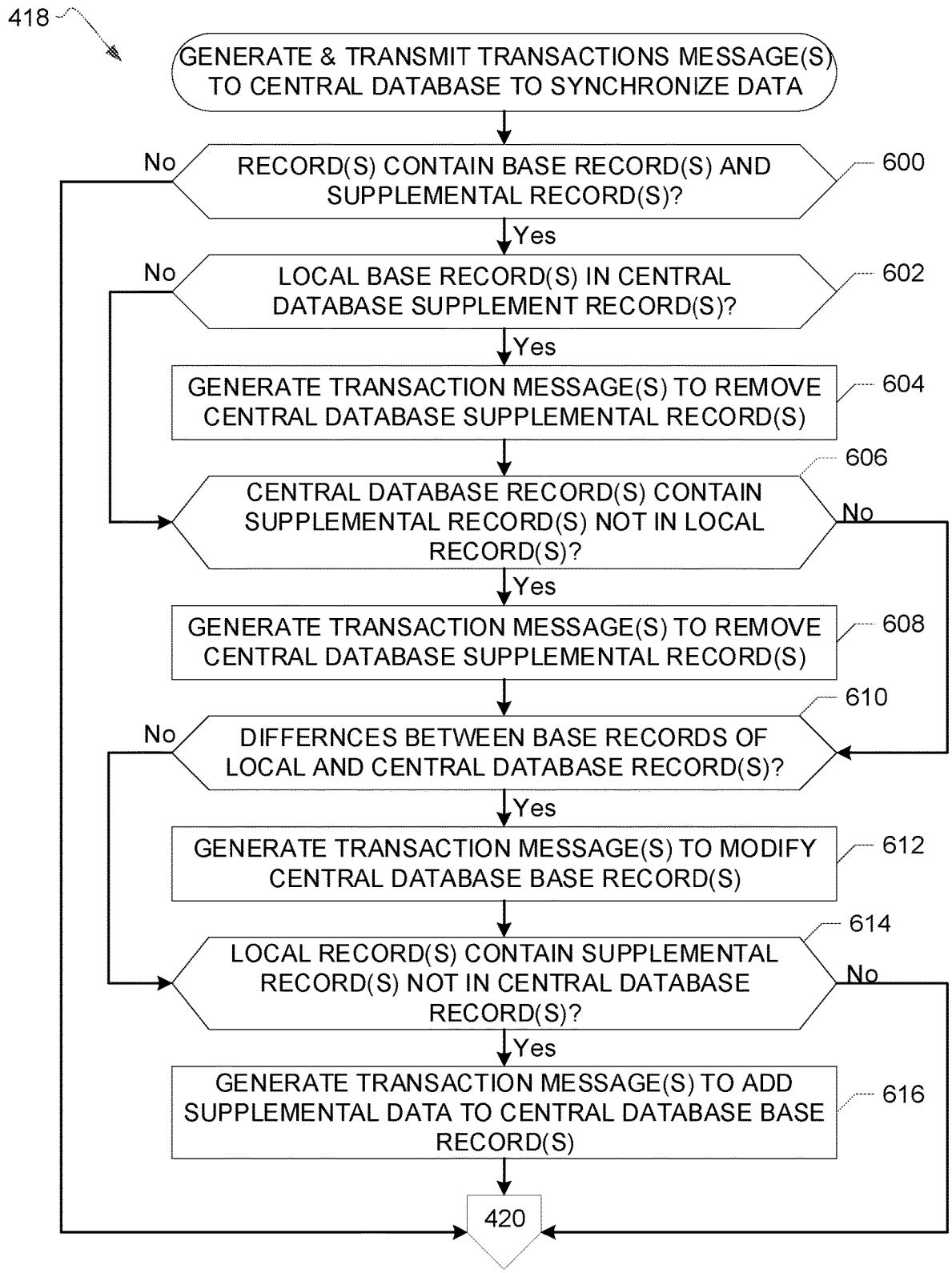
FIG. 6 is a flowchart representative of example machine readable instructions that may be executed to implement block 418 of FIG. 4.

Flowcharts representative of example machine readable instructions for implementing the record synchronizer 120 of FIGS. 1-3 are shown in FIGS. 4-6. In this example, the machine readable instructions comprise a program for execution by a processor such as the processor 120 shown in the example processor platform 700 discussed below in connection with FIG. 7. The program may be embodied in software stored on a non-transitory computer readable storage medium such as a CD-ROM, a floppy disk, a hard drive, a digital versatile disk (DVD), a Blu-ray disk, or a memory associated with the processor 120, but the entire program and/or parts thereof could alternatively be executed by a device other than the processor 120 and/or embodied in firmware or dedicated hardware. Further, although the example program is described with reference to the flowchart illustrated in FIGS. 4-6, many other methods of implementing the example record synchronizer 120 of FIGS. 1-3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 4-6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

FIG. 4 is a flowchart of example machine readable-instructions 400 that, when executed, cause the example record synchronizer 120 of FIGS. 1-3 to synchronize data in a local database (e.g., the first and/or second local databases 102, 108 of FIG. 1) with data in a central database (e.g., the NCIC database 114 of FIG. 1). The example instructions of FIG. 4 can be executed by the record synchronizer 120 of FIGS. 1, 2, and/or 3. In FIG. 4, the example record synchronizer 120 is in communication (e.g., wireless communication) with, for example, a database server storing the local database (e.g., the first and/or second local database servers 103, 109 of FIG. 1) and a database server storing the central database (e.g., the NCIC database server 115).

In the example of FIG. 4, the example request receiver 200 of FIG. 2 receives one or more record change request(s) 202 based on user inputs received via a processor associated with the first local database 102 and/or the second local database 108 (block 402). For example, the request(s) 202 can include data field(s) including new and/or updated data in the local record(s) 104, 106, 110, 112 of FIG. 1 relative to previous data entered into the local record(s).

The example request receiver 200 of FIG. 2 determines if the local record(s) include NCIC identifier(s) and, thus, corresponds to data previously entered into the central or NCIC database 114 (block 404). If the local record(s) include NCIC identifier(s), the example NCIC database searcher 212 of FIG. 2 queries the NCIC database 114 for NCIC record(s) that correspond to the local record(s) (block 406). For example, if a local record includes arrest warrant data, the NCIC database searcher 212 queries the NCIC database 114 for arrest warrant records.

In the example of FIG. 4, the example record parser 216 of FIG. 2 analyzes the NCIC record(s) 214 resulting from the search of the NCIC database 114. The example record parser 216 confirms that the NCIC database 114 includes data corresponding to the local record data based on, for example, the NCIC identifier(s) (block 408).

If the record parser 216 determines that the local record data is in the NCIC database 114, the record parser 216 parses (1) the local record(s) (e.g., the modified local record(s) 210 generated in response to the request(s) 202) to create the parsed local record(s) 218 and (2) the NCIC record(s) 214 retrieved from the search of the NCIC database 114 to generate the parsed NCIC record(s) 220 (block 410). For example, the data field mapper 300 of the record parser 216 of FIG. 3 maps the data field(s) in the local record(s) to the data field(s) in the NCIC record(s). The example record parser 216 of FIGS. 2 and 3 standardizes the data field(s) and/or the data formats between the local record(s) and the NCIC record(s) based on the data parsing rule(s) 222 stored in the database 206 of FIG. 2.

In the example of FIG. 4, the example record comparer 302 of the record parser 216 of FIG. 3 compares the value(s) in the mapped data field(s) of the parsed local record(s) 218 and the parsed NCIC record(s) 220 (block 412). The example record comparer 302 determines whether the value(s) in the data field(s) of the parsed local record(s) 218 and the parsed NCIC record(s) 220 are equivalent or different.

If the example record comparer 302 identifies differences between the data field value(s) in the parsed local record(s) 218 and the parsed NCIC record(s) 220 (block 414), the record comparer 302 generates the delta object(s) 224 (block 416). The delta object(s) 224 can include the data field(s) associated with the differing value(s), the value(s) in the parsed local record(s), and the value(s) in the parsed NCIC record(s) 220.

In the example of FIG. 4, the example communicator 226 of FIG. 2 generates transaction message(s) and transmits the transaction message(s) 228 to the central or NCIC database 114 (e.g., via the NCIC database server 115) to synchronize the local record data and NCIC record data (block 418). In some examples, the communicator 226 generates the transaction message(s) 228 based on the delta object(s) 224. For example, the communicator 226 can send a transaction message 228 to the NCIC database server 115 for each data field identified in a delta object 224 as requiring synchronization. In examples in which the request receiver 200 of FIG. 2 determines that the local record data is not associated with a NCIC identifier (block 404) or the record parser 216 does not find the local record data in the NCIC database search results (block 408), the communicator 226 can generate transaction message(s) 228 including instructions for a new NCIC record to be created at the NCIC database 114 and/or for new data to be added to the NCIC record(s). The transaction message(s) 228 can include data field value(s) formatted based on the NCIC database model for efficient inclusion of the value(s) in the NCIC database 114.

The example communicator 226 of FIG. 2 sends transaction messages 228 to the NCIC database server 115 if there are queued transaction messages (e.g., based on the delta object(s) 224) and if the communicator 226 receives responses from the NCIC database server 115 confirming that the data synchronization was successful (block 420). In some examples, if the communicator 226 receives an error message in response to sending a transaction message 228, the communicator 226 refrains from sending the remaining queued transaction message(s) 228. In such examples, the communicator 226 waits for user input(s) instructing the communicator 226 to resume sending transaction message(s) 228. In some other examples, the communicator 226 re-sends the transaction message(s) 228 at a later time, sends other transaction message(s) 228, and/or divides the transaction message(s) 228 associated with error into multiple transaction messages. In the example of FIG. 4, the example record status verifier 232 records the error message(s) in the synchronization error log 230, which can be viewed by a user.

In some examples, the record synchronizer 120 of FIGS. 1-3 confirms that the data field value(s) identified in the delta object(s) 224 have been successfully synchronized at the NCIC database 114 by comparing the updated NCIC record(s) to the parsed local record(s) 218 and verifying that there no differences between the records(s). Put another way, if the record parser 216 does not generate any delta object(s) 224 based on the comparison of the update NCIC record(s) and the local record(s) or if the delta object(s) 224 only include indications that the data field values are equivalent (e.g., "null" indicators in the delta object(s) 224), the record status verifier 232 confirms that the synchronization was successful. If the record parser 216 detects differences between the data field value(s) based on the updated NCIC record(s), the record status verifier 232 records the error(s) in the synchronization error log 230 and the communicator 226 refrains from sending further transaction message(s).

In the example of FIG. 4, if the record synchronizer 120 determines that the synchronization was successful, the record identifier manager 234 updates the local record(s) (block 422). For example, the record identifier manager 234 identifies the NCIC identifier(s) 236 assigned to the new NCIC record(s) (e.g., NCIC record identifier(s)), binary object data such as image data (e.g., NCIC image number), etc. The record identifier manager 234 communicates with the local database servers to enable the local record(s) to be updated with the NCIC identifier(s) 236 and, thus, to facilitate efficient future synchronization between the local record(s) and the NCIC database.

If there are additional delta object(s) 224 including data field(s) to be synchronized at the NCIC database 114 (block 424), the communicator 226 continues to transmits transaction message(s) 228 to the NCIC database server 115 to synchronize (e.g., update, add, replace) the NCIC record data with the local record data (block 418). If there are no further delta object(s) 224 (block 424) and no further record change request(s) 202 (block 426), the instructions 400 of FIG. 4 end.

FIG. 5 is a flowchart representative of example machine readable instructions that may be executed to implement block 412 of FIG. 4 to compare parsed local record(s) (e.g., the parsed local record(s) 218 of FIG. 2) with parsed central database record(s) (e.g., the parsed NCIC records(s) 220 of FIG. 2) in examples where the NCIC record(s) include binary object data (e.g., image data, video data, audio data, document data). The example instructions of FIG. 5 may be executed by the example record synchronizer 120 of FIGS. 1-3.

In the example of FIG. 5, the binary object analyzer 308 of the record parser 216 of FIG. 3 determines whether the parsed NCIC record(s) 220 include binary object data field(s) (block 500). For example, the binary object analyzer 308 determines if the NCIC record(s) include NCIC image number data. In the example of FIG. 5, if the parsed NCIC record(s) 220 include image data field(s) such as image number, the example binary object analyzer 308 determines if the parsed local record(s) 218 include equivalent binary object data (e.g., NCIC image number(s)) (block 502).

In the example of FIG. 5, the binary object analyzer 308 determines whether NCIC record(s) and the local record(s) include different the binary object data type values (block 504). For example, the binary object analyzer 308 determines whether there are differences in image data type values (e.g., values indicating that the images are mugshots, signatures, identifying images for property, etc.) (block 504). If the example binary object analyzer 308 of FIG. 3 determines that the NCIC record(s) and the local record(s) include, for example, image data with matching image type, the binary object analyzer 308 instructs the NCIC database searcher 212 to query the NCIC database 114 for the full set of image data associated with the NCIC record(s), including, for example, image date and image data such as pixel data (block 508). In response to the query, the NCIC database server 115 returns binary object element(s) 310.

In the example of FIG. 5, if the parsed local data record(s) 220 and the NCIC record(s) 220 include different binary object data types, the binary object analyzer 308 refrains from instructing the NCIC database searcher 212 to query the NCIC database 114. Instead, if the binary object data type value(s) are different, the binary object analyzer 308 recognizes the NCIC database 114 does not allow image data type to be modified in a NCIC record. Accordingly, the binary object analyzer 308 instructs the communicator 226 to generate transaction message(s) 228 for transmission to the NCIC database server 115 to remove the binary object data (e.g., image data) from the NCIC record(s) and to re-enter the binary object data (e.g., image data) into the NCIC record(s) (block 506). Thus, the example record synchronizer conserves processing resources in examples which the binary object data type (e.g., image data type) requires modification by refraining from searching the NCIC database and efficiently re-entering the binary object data (e.g., image data) at the NCIC database with the modified binary object data type (e.g. image data type).

In the example of FIG. 5, the record parser 216 parses the binary object response element(s) 310 to extract, for instance, image data and text data included in the binary object response element(s) 310 (block 510). Continuing to refer to the example in which the binary object(s) include image data, the example record parser 216 compares the data in the parsed image response element(s) to the image data in the parsed local record(s) 218 to identify differences between the image data of the local and NCIC records (block 512).

If the example record parser 216 determines that there are differences in the value(s) of the binary object data field(s) (e.g., image data field(s)) between the local record(s) and the NCIC record(s) (bock 514), the binary object analyzer 308 determines the messages to be sent to the NCIC database 114 to reconcile the differences.

Also, in the example of FIG. 5, if the example binary object analyzer 308 of the record parser 216 determines that the parsed NCIC record(s) 220 do not include binary object data field(s) (e.g., image data field(s)) (block 500), then the example binary object analyzer 308 determines the messages to be sent to the NCIC database 114 to reconcile any differences between the NCIC record(s) and the local record(s) (e.g., a transaction message to add binary object data such as image data) (block 516).

In some examples of FIG. 5, the binary object analyzer 308 determines that the parsed NCIC record(s) 220 include binary object data field(s) (e.g., image data field(s)) but the parsed local record(s) 218 do not include corresponding binary object data field(s) (block 502). In such examples, the example binary object analyzer 308 determines the messages to be sent to the NCIC database 114 to reconcile the differences (e.g., a transaction message to delete image data) (block 516).

In the example of FIG. 5, the binary object analyzer 308 instructs the communicator 226 to generate transaction message(s) 228 including, for instance, the NCIC image number, the NCIC image type, and the data to be synchronized for transmission to the NCIC database server 115 (e.g., image date) in examples in which the binary object(s) including image(s) (block 516).

In the example of FIG. 5, control advances to block 414 of FIG. 4 to continue comparing the local record data field(s) (e.g., non-image data field(s)), generating the delta object(s) 224, and generating and transmitting transaction message(s) 228 to be sent to the NCIC database 114. For example, if only the image date value(s) requires updating, the communicator 226 can generate transaction message(s) that include the image type, image number, and image date value(s) to be updated substantially as discussed above in connection with FIG. 3.

FIG. 6 is a flowchart representative of example machine readable instructions that may be executed to implement block 418 of FIG. 4 to generate and transmit transaction message(s) (e.g., the transaction message(s) 228 of FIG. 2) to a central database (e.g., the NCIC database 114 of FIG. 1) to synchronize data between the central database and a local database (e.g., the first and/or second local databases 102, 108 of FIG. 1) in instances in which the local record(s) and/or the central database record(s) include base record(s) (e.g., the base record(s) 111, 117 of FIG. 1) and supplemental record(s) (e.g., the supplemental record(s) 113, 119 of FIG. 1). The example instructions of FIG. 6 may be executed by the example record synchronizer 120 of FIGS. 1-3.

In the example of FIG. 6, the supplemental data analyzer 304 of the record parser 216 of FIG. 3 determines if the respective parsed local record(s) 218 and/or the parsed NCIC record(s) 220 include base record(s) 111, 117 and supplemental record(s) 113, 119 (block 600). If the supplemental data analyzer 304 determines the local record(s) and/or the NCIC record(s) include base record(s) and supplemental record(s), the supplemental data analyzer 304 applies the supplemental data rule(s) 306 to determine a sequence in which transaction message(s) 228 should be sent to the NCIC database server 115 to reconcile difference(s) between the local and NCIC record(s).

In the example of FIG. 6, the supplemental data analyzer 304 determines if a local base record 111 (e.g., data value(s) in one or more data fields of a local base record) is in a supplemental record 119 of a parsed NCIC record 220 (block 602). If the local base record 111 is in the supplemental record 119 of the NCIC record 220, the supplemental data analyzer 304 instructs the communicator 226 of FIG. 2 to generate and transmit one or more cancel supplemental record messages 228 to the NCIC database server 115 (block 604).

In the example of FIG. 6, the supplemental data analyzer 304 determines if the parsed NCIC record 220 includes any other supplemental record(s) 119 that are not a part of the parsed local record 218 (block 606). If the supplemental data analyzer 304 determines that the parsed NCIC record 220 includes supplemental record(s) that are not in the local record 218, the supplemental data analyzer 304 instructs the communicator 226 to generate and transmit one or more cancel supplemental record messages 228 to the NCIC database server 115 (block 608).

In the example of FIG. 6, the supplemental data analyzer 304 determines if there are any differences between the base record 111 of the parsed local record 218 and the base record 117 of the parsed NCIC record 220 (block 610). If the supplemental data analyzer 304 determines that there are differences between the respective base records 111, 117 of the parsed local record 218 and the parsed NCIC record 220, the supplemental data analyzer 304 instructs the communicator 226 to generate and transmit one or more transaction messages 228 to the NCIC database server 115 to modify the base record 117 of the NCIC record (block 612).

In the example of FIG. 6, the supplemental data analyzer 304 determines if the parsed local record 218 contains any supplemental record(s) 113 (e.g., data values in one or more data fields of a local supplemental record) that are not a part of the parsed NCIC record 220 (block 614). If the supplemental data analyzer 304 determines that parsed local record 218 includes supplemental record(s) 113 that are not in the parsed NCIC record 220, the supplemental data analyzer 304 instructs the communicator 226 to generate and transmit one or more transaction messages 228 to the NCIC database server 115 to add the supplemental record data to the NCIC record (block 616). In the example of FIG. 6, control advances to block 420 of FIG. 4 to confirm the synchronization of data between the local and central databases.

Figure 7:
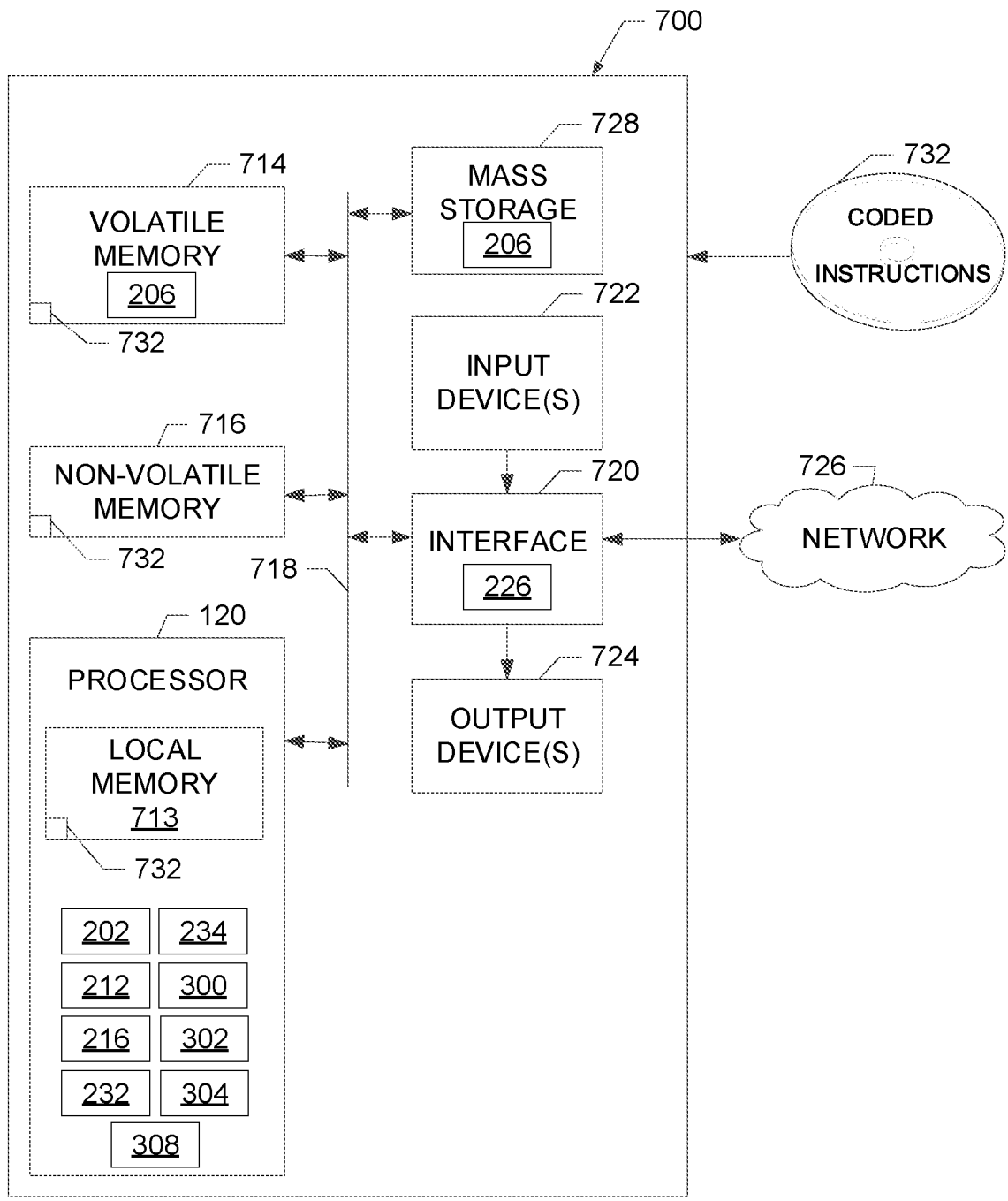
FIG. 7 illustrates an example processor platform that may execute the example instructions of FIGS. 4, 5, and/or 6 to implement the example system of FIGS. 1, 2, and/or 3.

FIG. 7 is a block diagram of an example processor platform 700 capable of executing the instructions of FIGS. 4, 5 and/or 6 to implement the record synchronizer of FIGS. 1-3. The processor platform 700 can be, for example, a server, a personal computer, a mobile device (e.g., a cell phone, a smart phone, a tablet such as an iPad™), a personal digital assistant (PDA), an Internet appliance, or any other type of computing device.

The processor platform 700 of the illustrated example includes a processor 120. The processor 120 of the illustrated example is hardware. For example, the processor 120 can be implemented by one or more integrated circuits, logic circuits, microprocessors or controllers from any desired family or manufacturer. The hardware processor may be a semiconductor based (e.g., silicon based) device. In this example, the processor 120 implements the example request receiver 200, the example NCIC database searcher 212, the example record parser 216, the example record status verifier 232, the example record identifier manager 234, the example data field mapper 300, the example record comparer 302, the example supplemental data analyzer 304, and the example binary object analyzer 308.

The processor 120 of the illustrated example includes a local memory 713 (e.g., a cache). The processor 120 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller. The database 206 of the processor 120 may be implemented by the main memory 714, 716 and/or the local memory 713.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and/or commands into the processor 120. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.). In this example, the communicator 226 is implemented by the interface circuit 720.

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives. Some or all of the database 206 may be stored in the mass storage 728.

The coded instructions 732 of FIGS. 4, 5, and/or 6 may be stored in the mass storage device 728, in the volatile memory 714, in the non-volatile memory 716, and/or on a removable tangible computer readable storage medium such as a CD or DVD.

From the foregoing, it will be appreciated that example methods, systems, and apparatus have been disclosed that provide for synchronization of data between a first or local database and a second or central database that accounts for differences in data models and/or rules between the databases. Disclosed examples generate temporary, parsed records based on the local records and the central database records to standardize data between the records, detect differences in the data, and generate transactions to synchronize the data between the databases. In the context of databases associated with, for example, municipal, state, and/or national agencies such as local and/or state law enforcement agencies and national agencies such as the FBI, example disclosed herein can be implemented to promote efficient sharing of data between the databases. In examples disclosed here, the central database (e.g., the NCIC database) is queried to ensure that the most up-to-date data is captured for comparison to the local record data. In examples disclosed herein, data can be updated at the central database substantially in real-time to provide access to current, shared data between, for example, local, state, and/or national agencies. Examples disclosed herein provide for efficient and accurate synchronization of data between databases in view of different data models between databases that previously hindered data sharing and/or required extensive manual resources.

"Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a request receiver to receive a request including a first record, the first record stored in a first database, the first record including a base record and a supplemental record;
   a database searcher to search a second database for a second record based on the request;
   a record parser to:
     generate a first parsed record based on the first record and a second parsed record based on the second record;
     perform a comparison of the first parsed record and the second parsed record; and
     identify a difference between first data in the first parsed record and second data in the second parsed record;
   a communicator;
   a supplemental data analyzer to determine a sequence in which the communicator is to transmit a first transaction message and a second transaction message to the second database to modify the second data,
     the supplemental data analyzer to determine the sequence based on the base record and the supplemental record,
     the communicator to transmit the first transaction message and the second transaction message to the second database based on the sequence to modify the second data based on the first data; and
   a binary object analyzer to:
     identify first binary object data in the first record and second binary object data in the second record, wherein the first binary object data is first image data and the second binary object data is second image data;
     perform a comparison of the first binary object data and the second binary object data; and
     instruct the database searcher to search the second database for a property of the second binary object data based on the comparison,
       wherein when the binary object analyzer identifies a difference in image type between the first image data and the second image data, the binary object analyzer is to instruct the database searcher to refrain from searching the second database for the property of the second image data, and
       the communicator is to transmit a third transaction message to the second database to remove the second image data and to enter the first image data in response to the binary object analyzer instructing the database searcher to refrain from searching the second database.

2. The apparatus of claim 1, further including a record status verifier to verify modification of the second data at the second database, the record parser to delete the first parsed record and the second parsed record in response to the verification of the modification.

3. The apparatus of claim 1, wherein the property includes one or more of image data or pixel values for the second image data.

4. The apparatus of claim 1, wherein the difference between the first data and the second data includes one or more of a difference in data field identifiers between the first parsed record and the second parsed record or a difference in data values between the first parsed record and the second parsed record.

5. An apparatus for improving an efficiency of synchronizing a first record in a first database with a second record in a second database, the apparatus comprising:
   a record parser to:
     generate a first parsed record based on the first record and a second parsed record based on the second record, the first parsed record and the second parsed record associated with a third database different from the first database and the second database; and
     identify first binary object image data in the first parsed record and second binary object image data in the second parsed record;
     perform a comparison of the first binary object image data and the second binary object image data;
     instruct a database searcher to search the second database for a property of the second binary object image data based on the comparison,
       wherein when the record parser identifies a difference in image type between the first binary object image data and the second binary object image data, the record parser is to instruct the database searcher to refrain from searching the second database for the property of the second binary object image data, and
   a communicator to, in response to the record parser instructing the database searcher to refrain from searching the second database, transmit an instruction to the second database to cause the second record to be modified by removing the second binary object image data and entering the first binary object image data; and a record status verifier to confirm the modification of the second record, the record parser to remove the second parsed record from the third database based on the confirmation.

6. The apparatus of claim 5, wherein the instruction is a first instruction and further including a supplemental data analyzer to:
identify a base record and a supplemental record associated with the first record; and
determine a sequence in which the communicator is to transmit the first instruction and a second instruction based on the base record and the supplemental record.

7. The apparatus of claim 5, further including a supplemental data analyzer to identify a base record and supplemental record associated with the second record, the communicator to transmit a second instruction to cancel the supplemental record and a third instruction to enter a second supplemental record.

8. The apparatus of claim 5, wherein the instruction is a first instruction and further including a record identifier manager to detect an identifier associated with the modified second record, the communicator to transmit a second instruction to the first database to modify the first record based on the identifier.

9. The apparatus of claim 5, wherein data in the first record is associated with a first data format, data in the second record is associated with a second data format different from the first data format, and data in the first parsed record and data in the second parsed record are associated with the second data format.

10. The apparatus of claim 5, wherein the record parser is to generate the first parsed record by mapping a data field in the first record to one or more corresponding data fields in the second record.

11. At least one non-transitory computer readable storage medium comprising instructions that, when executed, cause a machine to at least:
search a first database for a first record based on a record change request, the record change request associated with a second record stored in a second database different from the first database;
generate a first parsed record based on the first record and a second parsed record based on the second record, at least one of (a) the first parsed record including a first base record and a first supplemental record or (b) the second parsed record including a second base record and a second supplemental record;
perform a comparison of the first parsed record and the second parsed record;
identify a difference between first data in the first parsed record and second data in the second parsed record;
generate a first message including a first modification to the first data based on the second data and a second message including a second modification to the first data based on the second data;
determine a sequence in which to transmit the first message and the second message to the first database based on at least one of (a) the first base record and the first supplemental record of the first parsed record or (b) the second base record and the second supplemental record of the second parsed record;
transmit the first message and the second message to the first database based on the sequence;
identify first binary object image data in the first record and second binary object image data in the second record;
perform a comparison of the first binary object image data and the second binary object image data; and
search the second database for a property of the second binary object image data based on the comparison,
wherein when a difference in image type between the first binary object image data and the second binary object image data is identified based on the comparison, the instructions, when executed cause the machine to:
refrain from searching the second database for the property of the second binary object image data; and
transmit a third transaction message to the second database to remove the second binary object image data and to enter the first binary object image data.

12. The at least one non-transitory computer readable storage medium as defined in claim 11, wherein the instructions, when executed further cause the machine to:
verify modification of the first data at the first database; and
delete the first parsed record and the second parsed record based on the verification of the modification.

13. The at least one non-transitory computer readable storage medium as defined in claim 11, wherein the instructions, when executed further cause the machine to generate the second parsed record by mapping a data field in the second record to one or more corresponding data fields in the first record.

14. The at least one non-transitory computer readable storage medium as defined in claim 11, wherein the difference between the first data and the second data includes one or more of a difference in data field identifiers between the first parsed record and the second parsed record or a difference in data values between the first parsed record and the second parsed record.

15. The at least one non-transitory computer readable storage medium as defined in claim 11, wherein the first data in the first parsed record and the second data in the second parsed record are associated with a first data format.

16. The at least one non-transitory computer readable storage medium as defined in claim 15, wherein data in the first record is associated with a second data format different than the first data format.

17. An apparatus comprising:
at least one memory;
instructions in the apparatus; and
processor circuitry to execute the instructions to:
generate a first parsed record based on a first record and a second parsed record based on a second record, the first record in a first database and the second record in a second database;
identify first binary object data in the first parsed record and second binary object data in the second parsed record, the first binary object data including first image data and the second binary object data including second image data;
perform a comparison of the first binary object data and the second binary object data; and
search the second database for a property of the second binary object data based on the comparison,
wherein when a difference in image type is identified between the first image data and the second image data based on the comparison, the processor circuitry is to:
refrain from searching the second database for the property of the second image data; and transmit a transaction message to the second database to remove the second image data and to enter the first image data.

18. The apparatus of claim 17, wherein the processor circuitry is to parse the first binary object data to extract the first image data and first text data from the first binary object data.

19. The apparatus of claim 17, wherein the processor circuitry is to generate the first parsed record by mapping a data field in the first record to one or more corresponding data fields in the second record.

20. The apparatus of claim 17, wherein the processor circuitry is to adjust a format of one or more of first data in the first parsed record or second data in the second parsed record to cause the first parsed record and the second parsed record to be associated with a first data format.

21. The apparatus of claim 17, wherein the transaction message is a first transaction message, the first record includes a base record and a supplemental record, and the processor circuitry is to determine a sequence in which to transmit the first transaction message and a second transaction message to the second database to modify the second data.

\* \* \* \* \*